(12) United States Patent
Kumano et al.

(10) Patent No.: US 11,556,447 B2
(45) Date of Patent: Jan. 17, 2023

(54) USAGE PREDICTION METHOD AND STORAGE MEDIUM

(71) Applicant: FUJITSU LIMITED, Kawasaki (JP)

(72) Inventors: Tatsuo Kumano, Kawasaki (JP); Yukihiro Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 297 days.

(21) Appl. No.: 17/088,733

(22) Filed: Nov. 4, 2020

(65) Prior Publication Data

US 2021/0157705 A1 May 27, 2021

(30) Foreign Application Priority Data

Nov. 27, 2019 (JP) .............................. JP2019-213790

(51) Int. Cl.
| G06F 11/34 | (2006.01) |
| G06F 17/40 | (2006.01) |
| G06F 17/15 | (2006.01) |
| G06F 17/18 | (2006.01) |

(52) U.S. Cl.
CPC ........ *G06F 11/3409* (2013.01); *G06F 17/156* (2013.01); *G06F 17/18* (2013.01); *G06F 17/40* (2013.01)

(58) Field of Classification Search
CPC .... G06F 11/3409; G06F 17/156; G06F 17/18; G06F 17/40
See application file for complete search history.

(56) References Cited

U.S. PATENT DOCUMENTS

| 8,296,434 | B1* | 10/2012 | Miller | ................ | H04L 67/1004 |
| | | | | | 709/224 |
| 8,762,302 | B1* | 6/2014 | Spivack | ................ | G06N 5/046 |
| | | | | | 706/12 |
| 9,361,092 | B1* | 6/2016 | Bai | ................... | G06F 9/44505 |
| 9,804,797 | B1* | 10/2017 | Ng | ..................... | G06F 3/0613 |
| 10,438,229 | B1* | 10/2019 | Viswanath | ........ | G06Q 30/0249 |
| 11,424,812 | B1* | 8/2022 | Zhu | ....................... | H04B 7/086 |
| 2003/0208523 | A1* | 11/2003 | Gopalan | ................ | H04L 43/12 |
| | | | | | 709/224 |
| 2007/0055477 | A1* | 3/2007 | Chickering | ............ | G06Q 30/02 |
| | | | | | 702/182 |

(Continued)

FOREIGN PATENT DOCUMENTS

| JP | 2010-122825 A | 6/2010 |
| JP | 2013-87992 A | 5/2013 |
| JP | 2016-19358 A | 2/2016 |

*Primary Examiner* — Ninos Donabed
(74) *Attorney, Agent, or Firm* — Fujitsu Patent Center

(57) ABSTRACT

A usage prediction method executed by a computer, the usage prediction method includes classifying a plurality of records corresponding to a plurality of times included in first time-series data indicating a history of usages of a resource into a plurality of groups respectively corresponding to attributes of the plurality of times; generating second time-series data for each attribute by combining the records belonging to the group corresponding to the same attribute for the plurality of classified groups in order of the times; generating, for each attribute, an expression for calculating a predicted value to be used for calculating a predicted value of the usage based on the generated second time-series data; and calculating the predicted value of the usage based on the expression for calculating the predicted value for each attribute.

4 Claims, 21 Drawing Sheets

(56) References Cited

U.S. PATENT DOCUMENTS

| | | | |
|---|---|---|---|
| 2007/0185823 A1* | 8/2007 | Chen | H02J 3/008 706/15 |
| 2008/0112474 A1* | 5/2008 | Refaeli | H04B 3/542 375/222 |
| 2009/0122706 A1* | 5/2009 | Alfano | H04L 41/046 370/252 |
| 2011/0276982 A1* | 11/2011 | Nakayama | H04L 67/101 718/105 |
| 2012/0278164 A1* | 11/2012 | Spivack | G06F 16/9535 705/14.66 |
| 2014/0015418 A1* | 1/2014 | Pandharipande | H05B 47/11 315/152 |
| 2014/0129331 A1* | 5/2014 | Spivack | G06Q 30/0255 705/14.53 |
| 2014/0143057 A1* | 5/2014 | Lessin | G06Q 50/01 705/14.66 |
| 2014/0244051 A1* | 8/2014 | Rollins | G05D 27/02 700/282 |
| 2015/0106511 A1* | 4/2015 | Astigarraga | H04L 67/1095 709/224 |
| 2016/0157114 A1* | 6/2016 | Kalderen | H04L 47/26 370/252 |
| 2016/0226963 A1* | 8/2016 | Forsberg | G06F 9/46 |
| 2017/0098181 A1* | 4/2017 | Herman | G06N 5/003 |
| 2017/0236081 A1* | 8/2017 | Grady Smith | G06Q 10/0637 705/7.36 |
| 2018/0121431 A1* | 5/2018 | Shan | G06N 7/005 |
| 2018/0300739 A1* | 10/2018 | Ingle | G06Q 30/0202 |
| 2019/0370085 A1* | 12/2019 | Gross | G06F 9/5088 |
| 2019/0394096 A1* | 12/2019 | Bernat | G06F 9/4862 |
| 2020/0024712 A1* | 1/2020 | Iwamura | B21C 23/002 |

* cited by examiner

FIG. 20

181 INPUT

| DATE | 16 | 17 | 18 | 19 | 22 | 23 |
|---|---|---|---|---|---|---|
| DAY OF WEEK | Tue. | Wed. | Thu. | Fri. | Mon. | Tue. |
| NATIONAL HOLIDAY CATEGORY | | | | | | |
| PREDICTED VALUE | y1 | y2 | y3 | y4 | y5 | y6 |

182 INPUT

| DATE | 15 | 20 | 21 |
|---|---|---|---|
| DAY OF WEEK | Mon. | Sat. | Sun. |
| NATIONAL HOLIDAY | | | |
| PREDICTED VALUE | y7 | y8 | y9 |

183 OUTPUT

| DATE | 15 | 16 | 17 | 18 | 19 | 20 | 21 | 22 | 23 |
|---|---|---|---|---|---|---|---|---|---|
| DAY OF WEEK | Mon. | Tue. | Wed. | Thu. | Fri. | Sat. | Sun. | Mon. | Tue. |
| NATIONAL HOLIDAY CATEGORY | NATIONAL HOLIDAY | | | | | | | | |
| PREDICTED VALUE | y7 | y1 | y2 | y3 | y4 | y8 | y9 | y5 | y6 |

USAGE PREDICTION METHOD AND STORAGE MEDIUM

CROSS-REFERENCE TO RELATED APPLICATION

This application is based upon and claims the benefit of priority of the prior Japanese Patent Application No. 2019-213790, filed on Nov. 27, 2019, the entire contents of which are incorporated herein by reference.

FIELD

The embodiments discussed herein are related to a usage prediction method and a storage medium.

BACKGROUND

There is a technology for predicting a usage of a resource such as hardware or power in a system by an information processing apparatus such as a computer. For example, a load prediction apparatus that predicts an air conditioning load of an air conditioner that performs air conditioning of a server room has been proposed. A proposed load prediction apparatus extracts a data series subsequent to a similar series similar to a latest request series including a current point in time from time-series data of the air conditioning load measured at predetermined cycles, and generates a prediction data series of the air conditioning load by the extracted data series.

A demand prediction apparatus that generates a demand fluctuation pattern obtained by averaging pieces of actual data of power demands on a plurality of past days which is the same day of the week as a prediction day for each time has also been proposed. The proposed demand prediction apparatus predicts power demand after the current point in time by adding a difference between a data value of the generated demand fluctuation pattern at the current point in time and an actual value at the current point in time to the demand fluctuation pattern. For example, Japanese Laid-open Patent Publication No. 2013-87992 and Japanese Laid-open Patent Publication No. 2016-19358 are disclosed as the related art.

SUMMARY

According to an aspect of the embodiments, a usage prediction method executed by a computer, the usage prediction method includes classifying a plurality of records corresponding to a plurality of times included in first time-series data indicating a history of usages of a resource into a plurality of groups respectively corresponding to attributes of the plurality of times; generating second time-series data for each attribute by combining the records belonging to the group corresponding to the same attribute for the plurality of classified groups in order of the times; generating, for each attribute, an expression for calculating a predicted value to be used for calculating a predicted value of the usage based on the generated second time-series data; and calculating the predicted value of the usage based on the expression for calculating the predicted value for each attribute.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 20 is a diagram illustrating an example of combination of prediction results.

DESCRIPTION OF EMBODIMENTS

It is conceivable that an information processing apparatus generates a prediction model by using a method of time-series analysis or machine learning for time-series data of a resource usage and predicts the resource usage by the prediction model. Meanwhile, features of a change trend of the resource usage may change depending on a time zone, a day of the week, or the like in which a system is operated. Thus, when a single prediction model is created from input time-series data, it is difficult to reflect a change trend specific to a specific time zone, a specific day of the week, or the like on the prediction model, and prediction accuracy is reduced.

In view of the above circumstances, it is an object of the embodiments to improve prediction accuracy.

Hereinafter, the embodiments will be described with reference to the drawings.

First Embodiment

A first embodiment will be described.

Figure 1:
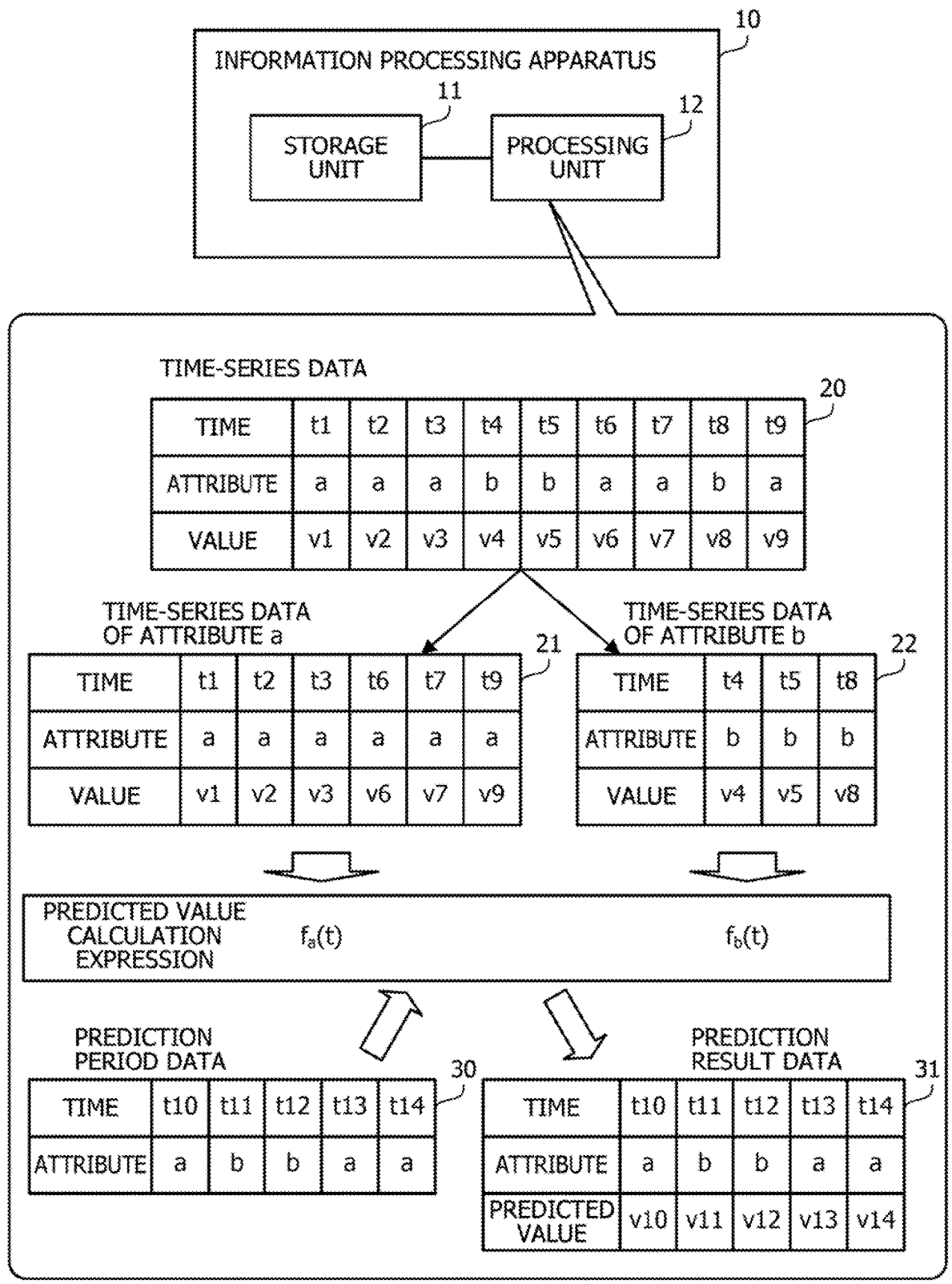
FIG. 1 is a diagram illustrating an example of processing of an information processing apparatus according to a first embodiment.

FIG. 1 is a diagram illustrating an example of processing of an information processing apparatus according to the first embodiment.

An information processing apparatus 10 predicts a future usage based on a history of usages of a resource in an information processing system. The resource is, for example, a hardware resource such as a central processing unit (CPU), a random-access memory (RAM), or a network interface card (NIC) included in the information processing system. The resource may be, for example, power or energy consumed by the information processing system.

The information processing apparatus 10 models the usage of the resource in the information processing system based on the time-series data indicating the history of the usages of the resource by the method of the time-series analysis or the machine learning. Examples of a method for generating the prediction model by the time-series analysis include an autoregressive integrated moving average (ARIMA) model, a state space model, and the like. Examples of a method for generating the prediction model by the machine learning include deep learning and the like.

A storage unit 11 may be a volatile storage device such as a RAM, or may be a non-volatile storage device such as a hard disk drive (HDD) or a flash memory. A processing unit 12 may include a CPU, a digital signal processor (DSP), an application-specific integrated circuit (ASIC), a field-programmable gate array (FPGA), and the like. The processing unit 12 may be a processor that executes a program. The "processor" referred to herein may include a set of a plurality of processors (multiprocessor).

The storage unit 11 stores time-series data 20. The time-series data 20 indicates a history of usages of a resource. The time-series data 20 includes a plurality of records corresponding to a plurality of past times. Each record includes a value indicating the usage of the resource. For example, the time-series data 20 includes records respectively corresponding to past times t1 to t9. For the times t1 to t9, the time t1 is the oldest time, the times t2, t3, . . . become newer in this order, and the time t9 is the newest time. For example, t1<t2< . . . <t9. The records of the times t1 to t9 include values v1 to v9, respectively.

The processing unit 12 classifies a plurality of records corresponding to a plurality of times included in first time-series data into a plurality of groups respectively corresponding to the attributes of the plurality of times. The attribute is information used for classifying the times, and is determined depending on, for example, a day of the week, a time zone of one day, or the like to which the time belongs. "Weekday" and "holiday" are conceivable as an example of the attribute. A time zone of "daytime" and a time zone of "nighttime" are conceivable as another example of the attribute. The attributes may be used for classifying the times into three or more types. For example, "weekday daytime", "weekday nighttime", "holiday daytime", and "holiday nighttime" are also conceivable as the attribute.

The attributes of the times may be included in the time-series data 20, or may be input to the information processing apparatus 10 separately from the time-series data 20. Alternatively, the attribute of each time may be determined by the processing unit 12 depending on a day of the week or a time zone of a day, or the like to which each time belongs.

In the example of the time-series data 20, the times t1 to t9 are classified into two attributes a and b. The times t1 to t3, t6, t7, and t9 have the attribute a. The times t4, t5, and t8 have the attribute b. In this case, the processing unit 12 classifies the records of the times t1 to t9 into a group of the attribute a including the records of the times t1 to t3, t6, t7, and t9 and a group of the attribute b including the records of the times t4, t5, and t8.

The processing unit 12 generates second time-series data for each attribute by combining the records belonging to the group corresponding to the same attribute in the order of the times. For example, the processing unit 12 generates time-series data 21 by combining the records belonging to the group of the attribute a in the order of the times. The processing unit 12 generates time-series data 22 by combining the records belonging to the group of the attribute b in the order of the times.

The time-series data 21 includes the records of the times t1, t2, t3, t6, t7, and t9 in chronological order. The times t3 and t6 are discontinuous in reality, but are handled as continuous times in processing of generating the prediction model. The time-series data 22 includes the records of the times t4, t5, and t8 in chronological order. The times t5 and t8 are discontinuous in reality, but are handled as continuous times in processing of generating of the prediction model. Each record of the pieces of time-series data 21 and 22 may or may not include information on the attribute.

The processing unit 12 generates, for each attribute, a predicted value calculation expression used for calculating a predicted value of the resource usage based on the generated second time-series data. The processing unit 12 generates, for each attribute, the predicted value calculation expression corresponding to the prediction model of the resource usage based on the second time-series data by the existing method of the time-series analysis or the machine learning. The predicted value calculation expression is obtained as a function for a time t. The time t may be represented as a time elapsed from a reference time. For example, the processing unit 12 generates a predicted value calculation expression $f_a(t)$ for the attribute a. The processing unit 12 generates a predicted value calculation expression $f_b(t)$ for the attribute b. The processing unit 12 stores information indicating the predicted value calculation expression $f_a(t)$ and information indicating the predicted value calculation expression $f_b(t)$ in the storage unit 11.

The processing unit 12 calculates the predicted value of the resource usage based on the predicted value calculation expression for each attribute. For example, the processing unit 12 receives prediction period data 30. The prediction period data 30 is information indicating a plurality of times at which predicted values are to be calculated. The processing unit 12 calculates the predicted value of the resource usage for each of the plurality of times designated by the prediction period data 30.

For example, the prediction period data 30 indicates times t10 to t14. For the times t10 to t14, $t10<t11<t12<t13<t14$. The prediction period data 30 includes information on an attribute of each of the times t10 to t14. However, the information on the attribute of each of the times t10 to t14 may be input by the information processing apparatus 10 separately from the prediction period data 30, or may be determined by the processing unit 12 depending on a day of the week or a time zone of a day to which each time belongs. For example, the times t10, t13, and t14 have the attribute a. The times t11 and t12 have the attribute b.

In this case, the processing unit 12 calculates predicted values v10, v13, and v14 for the times t10, t13, and t14 having the attribute a, respectively, by using the predicted value calculation expression $f_a(t)$ of the attribute a. The processing unit 12 calculates predicted values v11 and v12 for the times t11 and t12 having the attribute b, respectively, by using the predicted value calculation expression $f_b(t)$ of the attribute b. The processing unit 12 generates prediction result data 31 by merging the respective predicted values calculated by using the predicted value calculation expression $f_a(t)$ and the predicted value calculation expression $f_b(t)$ in chronological order. The prediction result data 31 includes the values v10 to v14 corresponding to the times t10 to t14, respectively. The prediction result data 31 may or may not include the information on the attribute.

According to the information processing apparatus 10, the plurality of records corresponding to the plurality of times included in the first time-series data indicating the history of the resource usages is classified into the plurality of groups respectively corresponding to the attributes of the plurality of times. The second time-series data is generated for each attribute by combining the records belonging to the group corresponding to the same attribute in the order of the times. The predicted value calculation expression used for calculating the predicted value of the resource usage is generated for each attribute based on the generated second time-series data. The predicted value of the resource usage is calculated based on the predicted value calculation expression for each attribute.

Accordingly, the prediction accuracy may be improved. For example, since prediction in accordance with characteristics of each group such as a weekday group and a holiday group may be performed for each group, more accurate prediction may be performed.

The features of the change trend of the resource usage may change depending on the time zone, the day of the week, or the like in which the information processing system is operated. For example, the change trend of the resource usage may vary between the weekday and the holiday. The change trend of the resource usage may vary between the time zone of the daytime and the time zone of the nighttime. When the single prediction model is created from the input time-series data by the method of the time-series analysis, the machine learning, or the like, it is difficult to reflect a change trend specific to the attribute such as a specific time zone, a specific day of the week, a specific weekday, or a specific holiday on the prediction model. Thus, the accuracy of the prediction using the prediction model is reduced.

Accordingly, the information processing apparatus 10 generates the time-series data for each attribute by classifying the original time-series data for each attribute of the time and combining the pieces of classified time-series data, and individually generates the predicted value calculation expression for each attribute of the time based on the time-series data for each attribute by the method of the time-series analysis or the machine learning. The features of the change trend corresponding to the attribute of the time such as the time zone, the day of the week, the weekday, or the holiday are more remarkably reflected on the predicted value calculation expression corresponding to the prediction model. Thus, the information processing apparatus 10 may improve the prediction accuracy by performing the prediction by using the predicted value calculation expression.

Second Embodiment

Next, a second embodiment will be described.

Figure 2:
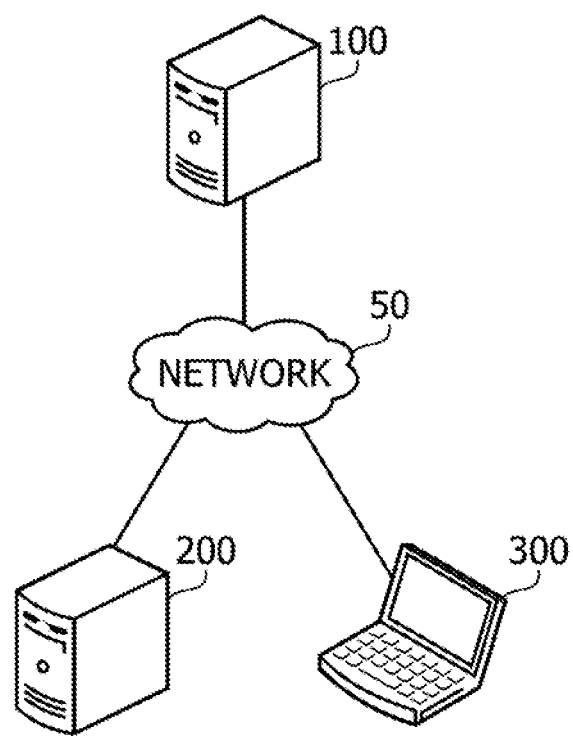
FIG. 2 is a diagram illustrating an example of an information processing system according to a second embodiment.

FIG. 2 is a diagram illustrating an example of an information processing system according to the second embodiment.

The information processing system according to the second embodiment includes a prediction apparatus 100, a server apparatus 200, and a client apparatus 300. The prediction apparatus 100, the server apparatus 200, and the client apparatus 300 are coupled to a network 50. Examples of the network 50 include a local area network (LAN), a wide area network (WAN), the Internet, and the like.

The prediction apparatus 100 is a server computer that predicts a resource usage of the server apparatus 200. The resource usage of the server apparatus 200 may also be referred to as a load of the server apparatus 200. The resource is, for example, a hardware resource such as a CPU, a RAM, or a NIC included in the server apparatus 200. The resource may be power, energy, or the like, consumed by the server apparatus 200. The resource usage is represented by a unit such as a usage rate (%), a usage size (for example, bytes or bits), or consumption (for example, watts (W) or joules (J)).

The prediction apparatus 100 generates a predicted value calculation model based on time-series data indicating a history of resource usages of the server apparatus 200 by the method of the time-series analysis or the machine learning. The prediction apparatus 100 predicts the resource usage by using the generated predicted value calculation model. The prediction apparatus 100 is an example of the information processing apparatus 10 according to the first embodiment.

The server apparatus 200 is a server computer that executes software used by a user. The server apparatus 200 generates time-series data indicating a history of a resource usage due to the execution of the software. The server apparatus 200 provides the time-series data to the prediction apparatus 100 via the network 50.

The client apparatus 300 is a client computer used by a user. The client apparatus 300 acquires the time-series data generated by the server apparatus 200, and transmits the time-series data to the prediction apparatus 100. The time-series data generated by the server apparatus 200 may be transmitted to the prediction apparatus 100 from the server apparatus 200.

The client apparatus 300 transmits a prediction request of the resource usage to the prediction apparatus 100. The prediction request includes designation of a period to be predicted. The period to be predicted is designated by the user, for example. The client apparatus 300 receives the prediction result of the resource usage corresponding to the prediction request from the prediction apparatus 100. The client apparatus 300 displays a screen indicating the prediction result on a display coupled to the client apparatus 300.

Figure 3:
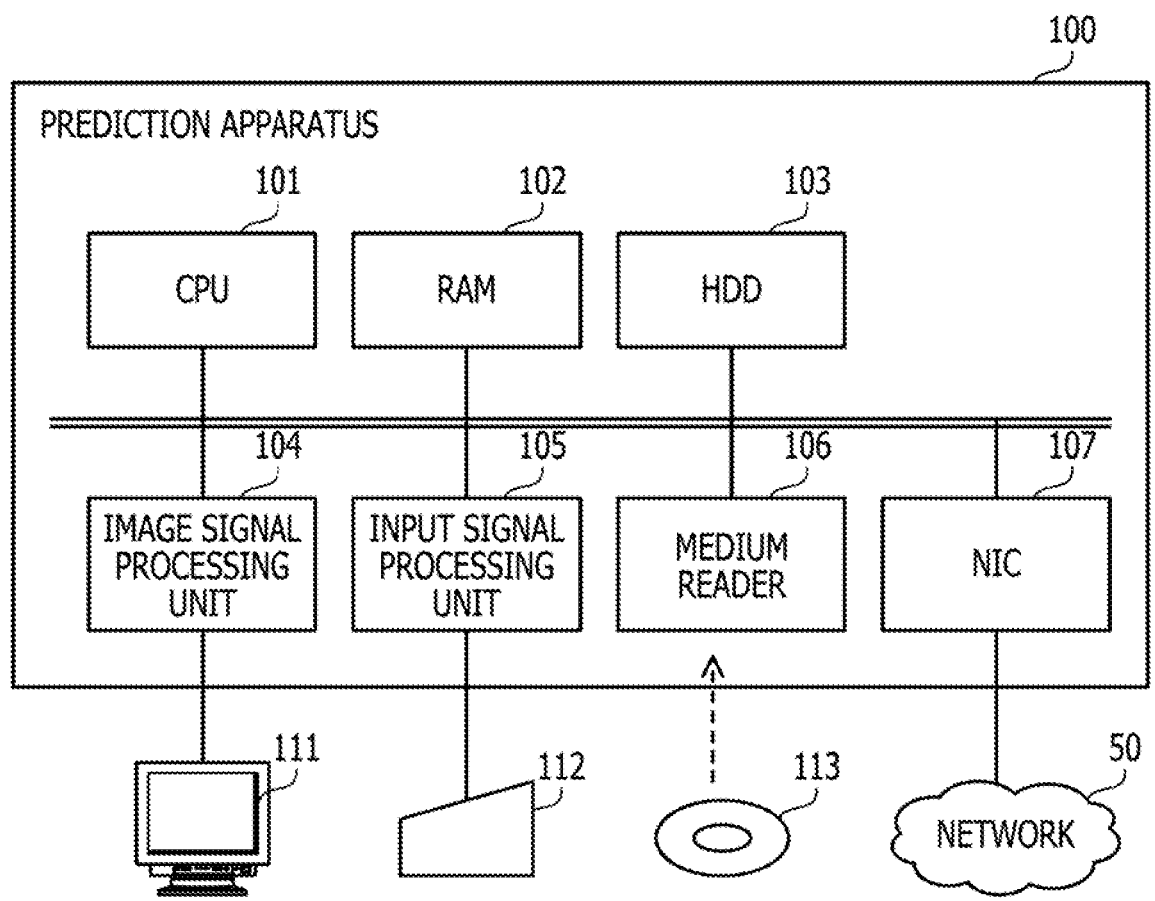
FIG. 3 is a diagram illustrating an example of hardware of a prediction apparatus.

FIG. 3 is a diagram illustrating an example of hardware of the prediction apparatus. The prediction apparatus 100 includes a CPU 101, a RAM 102, an HDD 103, an image signal processing unit 104, an input signal processing unit 105, a medium reader 105, and a network interface card (NIC) 107. The CPU 101 corresponds to the processing unit 12 according to the first embodiment. The RAM 102 or the HDD 103 corresponds to the storage unit 11 according to the first embodiment.

The CPU 101 is a processor that executes a command of a program. The CPU 101 loads at least a part of a program or data stored in the HDD 103 into the RAM 102, and executes the program. The CPU 101 may include a plurality of processor cores. The prediction apparatus 100 may include a plurality of processors. Processing which will be described below may be executed in parallel by using a plurality of processors or processor cores. A set of the plurality of processors will be referred to as a "multiprocessor" or merely referred to as a "processor" in some cases.

The RAM 102 is a volatile semiconductor memory that temporarily stores the program executed by the CPU 101 and data used for the operation by the CPU 101. The prediction apparatus 100 may include memories of types other than the RAM, and may include a plurality of memories.

The HDD 103 is a non-volatile storage device that stores data as well as software programs such as an operating system (OS), middleware, and application software. The prediction apparatus 100 may include other types of storage devices such as a flash memory and a solid-state drive (SSD), and may include a plurality of non-volatile storage devices.

The image signal processing unit 104 outputs an image to a display 111 coupled to the prediction apparatus 100 in accordance with a command from the CPU 101. As the display 111, any type of display such as a cathode ray tube (CRT) display, a liquid crystal display (LCD), a plasma display, or an organic electro-luminescence (OEL) display may be used.

The input signal processing unit 105 acquires an input signal from an input device 112 coupled to the prediction apparatus 100, and outputs the input signal to the CPU 101. As the input device 112, a pointing device such as a mouse, a touch panel, a touchpad, or a trackball, a keyboard, a remote controller, a button switch, or the like may be used. A plurality of types of input devices may be coupled to the prediction apparatus 100.

The medium reader 106 is a reading device that reads programs and data recorded in a recording medium 113. As the recording medium 113, for example, a magnetic disk, an optical disk, a magneto-optical disk (MO), a semiconductor memory, or the like may be used. The magnetic disk includes a flexible disk (FD) or an HDD. The optical disk includes a compact disk (CD) or a digital versatile disk (DVD).

The medium reader 106 copies, for example, the program and data read from the recording medium 113 to another recording medium such as the RAM 102 or the HDD 103. The read program is executed by, for example, the CPU 101. The recording medium 113 may be a portable recording medium, or may be used to distribute the program and data. The recording medium 113 and the HDD 103 may be referred to as a computer-readable recording medium.

The NIC 107 is coupled to the network 50 and is an interface that communicates with another computer via the network 50. The NIC 107 is coupled, for example, to a communication device such as a switch or a router via a cable.

Figure 4:
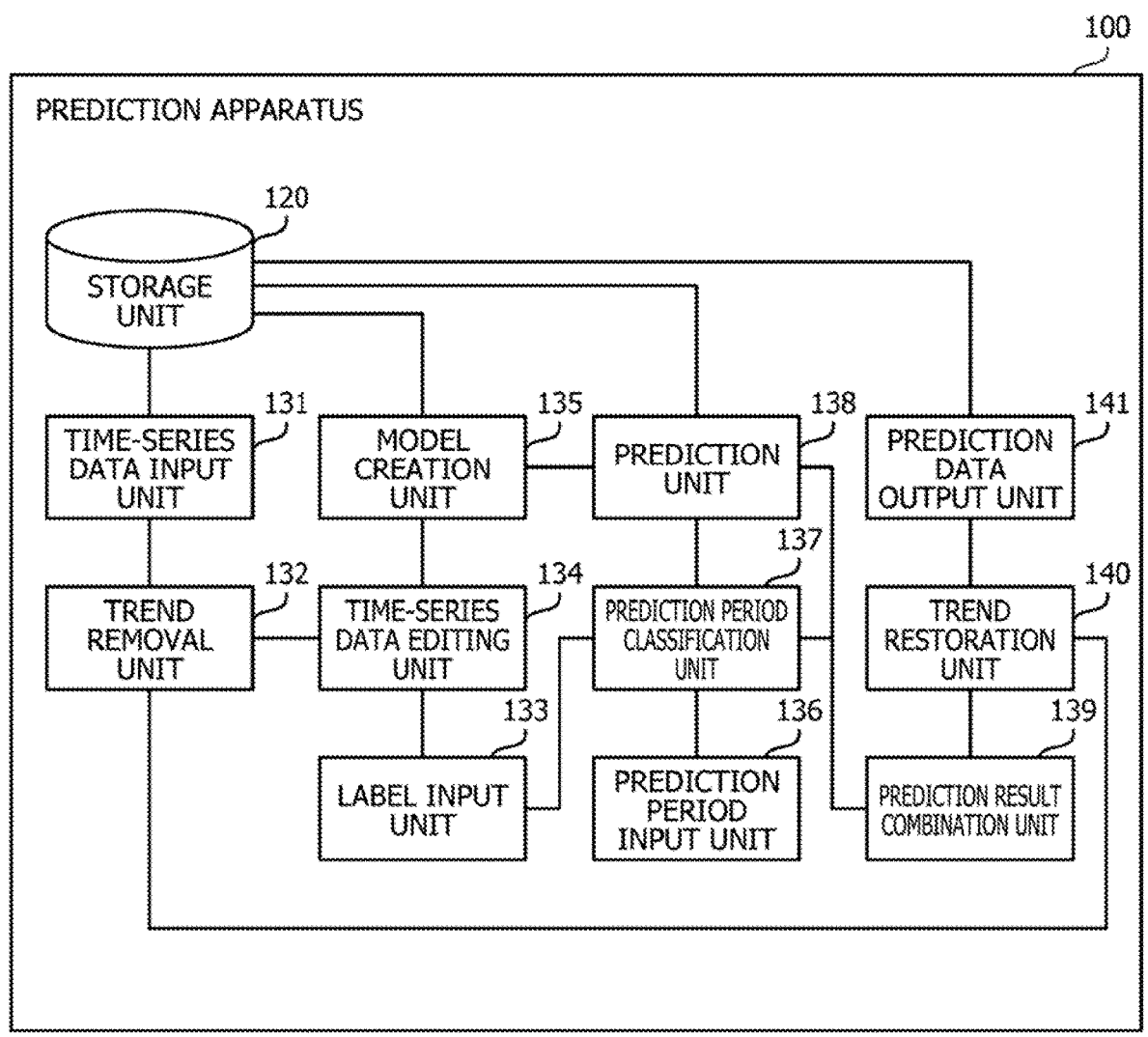
FIG. 4 is a diagram illustrating a functional example of the prediction apparatus.

FIG. 4 is a diagram illustrating a functional example of the prediction apparatus.

The prediction apparatus 100 includes a storage unit 120, a time series data input unit 131, a trend removal unit 132, a label input unit 133, a time-series data editing unit 134, a model creation unit 135, a prediction period input unit 136, a prediction period classification unit 137, a prediction unit 138, a prediction result combination unit 139, a trend restoration unit 140, and a prediction data output unit 141.

As the storage unit 120, a storage area of the RAM102 or the HDD1O3 is used. The time-series data input unit 131, the trend removal unit 132, the label input unit 133, the time-series data editing unit 134, the model creation unit 135, the prediction period input unit 136, the prediction period classification unit 137, the prediction unit 138, the prediction result combination unit 139, the trend restoration unit 140, and the prediction data output unit 141 are realized by the CPU101 executing the program.

In FIG. 4, a line coupling each of the time-series data input unit 131, the model creation unit 135, the prediction unit 138, and the prediction data output unit 141 to the storage unit 120 is illustrated, and a line coupling each of the other units to the storage unit 120 is not illustrated.

The storage unit 120 stores the time-series data used for predicting the resource usage, information on the trend and the predicted value calculation model, and prediction data indicating the prediction result. The trend is a trend of a wide change in the resource usage that does not depend on the attribute of the time in the time-series data. Examples of the trend include an increase in the resource usage due to an increase in the total number of users who use the software, an increase in the resource usage due to an increase in the amount of calculation corresponding to the function expansion of the software, and the like.

The storage unit 120 stores label data and the prediction period data. The label data is data indicating each time or a label such as a day or a time zone to which each time belongs. The label is associated with the attribute of each time. For example, an attribute "weekday" is associated with labels "Monday" to "Friday". An attribute "holiday" is associated with labels "Saturday", "Sunday", and "national holiday". For example, for a certain date, the attribute "holiday" is associated with "Monday" and "national holiday". Alternatively, the label itself may indicate the attribute. For example, the attribute "Monday" may be associated with the label "Monday". For example, an attribute "daytime" and an attribute "nighttime" may be associated with a label "daytime" and a label "nighttime", respectively. The attribute to be associated with the label is determined, for example, depending on a usage trend of the user of the server apparatus 200 to be predicted which corresponds to the day of the week, the time zone, or the like. The storage unit 120 stores information indicating the attribute associated with the label in advance.

The storage unit 120 stores the prediction period data. The prediction period data is data of a prediction period designated by the client apparatus 300.

The time-series data input unit 131 acquires the time-series data stored in the storage unit 120, and inputs the time-series data to the trend removal unit 132. The time-series data is information indicating the history of the resource usages of the server apparatus 200.

The trend removal unit 132 obtains the tend based on the time-series data, and removes the trend from the time-series data. The trend removal unit 132 obtains a trend calculation expression that is an expression indicating the trend by performing, for example, linear regression analysis on the time-series data. The trend removal unit 132 obtains a trend value of each time of the time-series data based on the trend calculation expression. The trend removal unit 132 removes the trend from the time-series data by subtracting the trend value of the time from the resource usages of the time-series data, and generates trend-removed time-series data.

The label input unit 133 inputs the label of each time to the time-series data editing unit 134 and the prediction period classification unit 137.

The time-series data editing unit 134 classifies a plurality of records included in the trend-removed time-series data into a plurality of groups respectively corresponding to the attributes of the times. The time-series data editing unit 134 generates the time-series data for each attribute by combining the records belonging to the group of the same attribute. The time-series data editing unit 134 determines the attribute of each of the plurality of times based on the label data indicating the day of the week or the time zone of the day to which each of the plurality of times included in the time-series data belongs. Information indicating the association relationship between the label and the attribute in the label data is stored in advance in the storage unit 120 as described above.

The model creation unit 135 creates the predicted value calculation model of the resource usage based on the time-series data for each attribute generated by the time-series data editing unit 134. The model creation unit 135 stores information on the created predicted value calculation model in the storage unit 120. For example, the model creation unit 135 uses the method of the time-series analysis or the machine learning in the creation of the predicted value calculation model. Examples of the method for creating the predicted value calculation model using the time-series analysis include an ARIMA model, a state space model, and the like. Examples of the method for creating the predicted value calculation model using the machine learning include deep learning and the like.

The prediction period input unit 136 inputs information on the prediction period included in the prediction request received from the client apparatus 300 to the prediction period classification unit 137.

The prediction period classification unit 137 classifies the respective times included in the prediction period according to the attributes. The prediction period classification unit 137 determines the attribute of each of the plurality of times based on the label data indicating the day of the week or the time zone of the day to which each of the plurality of times included in the prediction period belongs.

The prediction unit 138 predicts the resource usage in the prediction period. For example, the prediction unit 138 calculates the predicted value of the resource usage of the time to be predicted based on the predicted value calculation model corresponding to the attribute of the time to be predicted included in the prediction period. At this time, the prediction unit 138 selects the predicted value calculation expression to be used for calculating the predicted value for the time to be predicted depending on the attribute of the time to be predicted. The prediction unit 138 calculates the predicted value of the resource usage for the time to be predicted by using the predicted value calculation expression corresponding to the attribute of the time to be predicted. The predicted value calculated by the prediction unit 138 is a value that does not include the influence of the trend.

The prediction result combination unit 139 combines the prediction results of the resource usage for each attribute calculated by the prediction unit 138. For example, the prediction result combination unit 139 outputs the combined prediction result obtained by combining the records of the predicted values calculated for the respective times to be predicted included in the prediction period in the chronological order of the times to be predicted.

The trend restoration unit 140 restores the trend for the prediction result combined by the prediction result combination unit 139. For example, the trend restoration unit 140 acquires the trend calculation expression from the trend removal unit 132, and calculates the trend value corresponding to each time included in the prediction period based on the trend calculation expression. The trend restoration unit 140 restores the trend by adding the trend value of the time to the predicted value of the resource usage of each time in the prediction period. Data obtained by restoring the trend for the combined prediction result is final prediction data.

The prediction data output unit 141 outputs the prediction data generated by the trend restoration unit 140. For example, the prediction data output unit 141 stores the prediction data in the storage unit 120. The prediction data output unit 141 transmits the prediction data to the client apparatus 300. The prediction data output unit 141 may display the content of the prediction data on the display 111.

Figure 5:
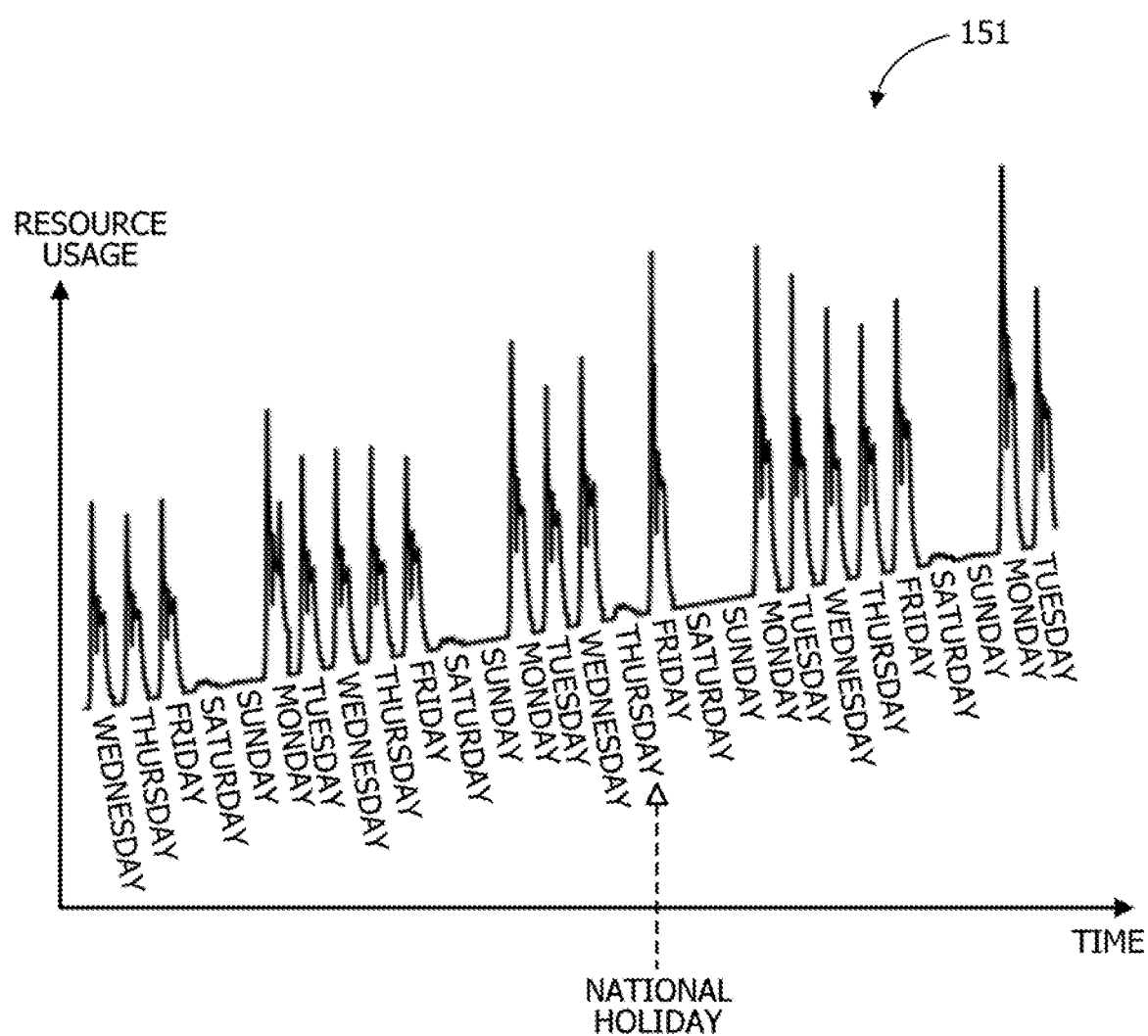
FIG. 5 is a diagram illustrating an example of time-series data.

FIG. 5 is a diagram illustrating an example of the time-series data.

A graph 151 represents an example of the time-series data indicating the history of the resource usages of the server apparatus 200. A horizontal axis of the graph 151 represents the time. A vertical axis of the graph 151 represents the resource usage. In the example of the graph 151, the day of the week is indicated as the label corresponding to each time. Monday to Friday other than the national holiday correspond to the attribute of "weekday". Saturday, Sunday, and the national holiday correspond to the attribute of "holiday".

According to the graph 151, the change trend of the resource usage on the weekday is significantly different from the change trend of the resource usage on the holiday.

Figure 6:
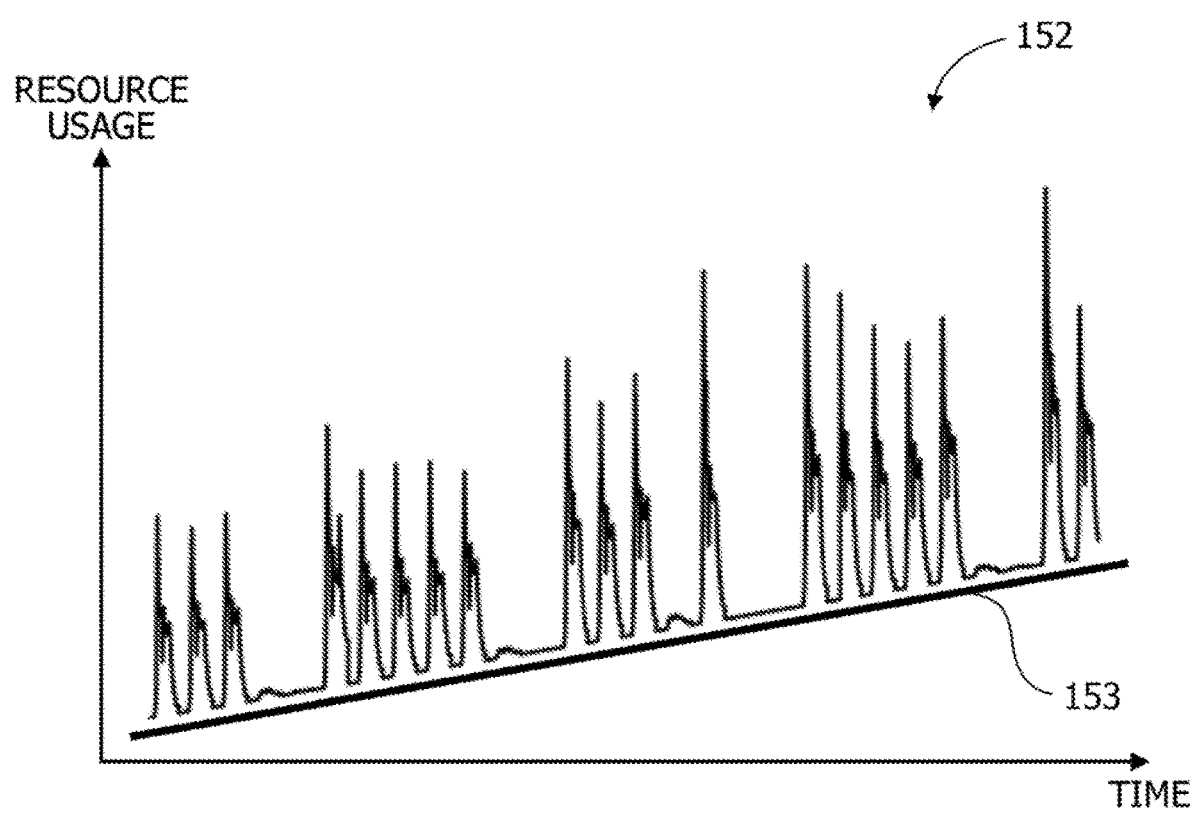
FIG. 6 is a diagram illustrating an example of a trend.

FIG. 6 is a diagram illustrating an example of the trend.

A graph 152 represents an example of the time-series data indicating the history of the resource usages of the server apparatus 200. A horizontal axis of the graph 152 represents the time. A vertical axis of the graph 152 represents the resource usage. FIG. 6 also illustrates a trend 153 extracted for the time-series data. The trend calculation expression representing the trend 153 is obtained as a linear function related to the time by, for example, linear approximation over all the times of the time-series data. The trend calculation expression is obtained, for example, as an expression representing a trend value for an absolute time. The trend 153 may be obtained as second or higher-degree functions, an exponential function, or the like related to the time. The trend removal unit 132 may obtain the trend calculation expression by a moving average instead of the linear approximation. The trend removal unit 132 may obtain the trend calculation expression by the linear approximation for a range divided into a fixed number instead of the linear approximation for the entire time-series data.

The trend removal unit 132 removes the trend 153 from the time-series data represented by the graph 152. The time-series data editing unit 134 classifies the respective records of the time-series data into the plurality of groups for each attribute, and combines the records belonging to the same group in the order of the times.

Figure 7:
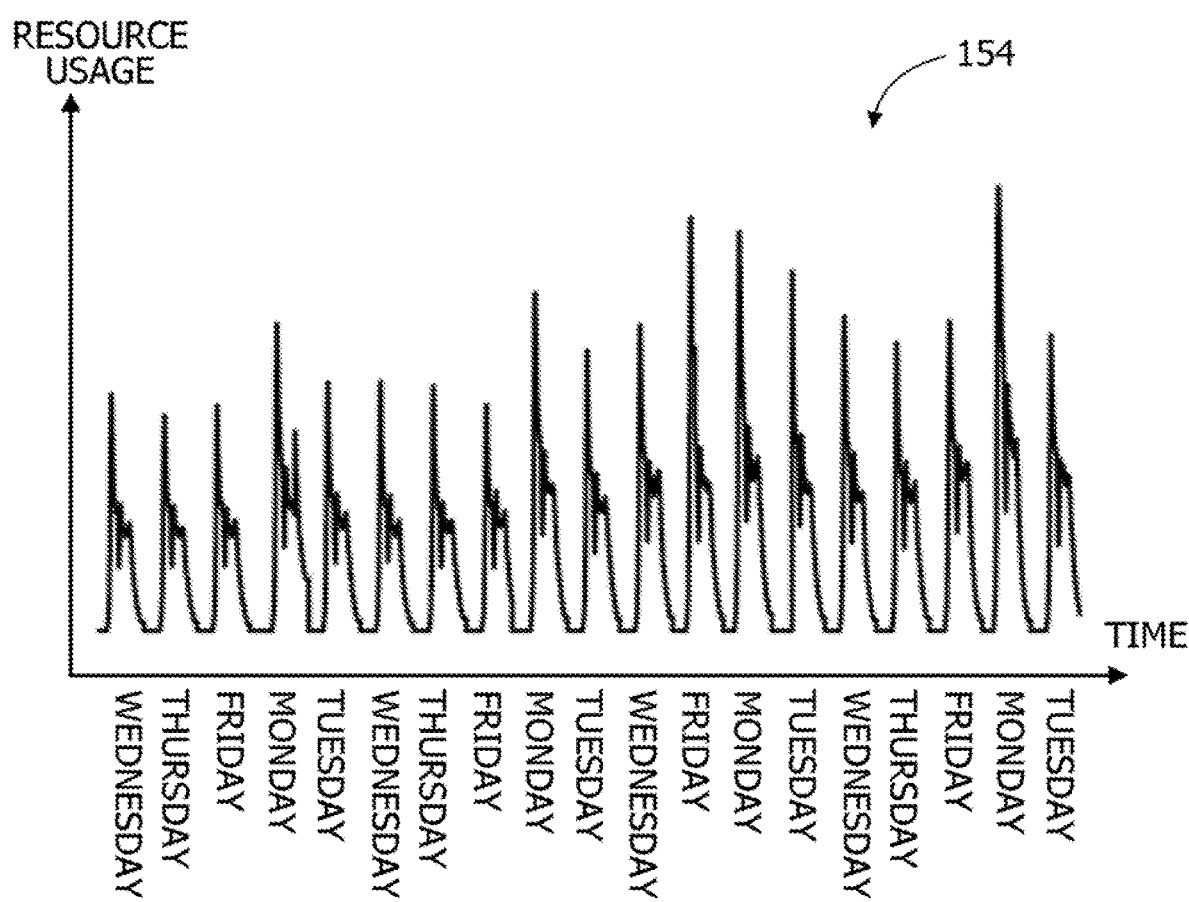
FIG. 7 is a diagram illustrating an example of time-series data combined for a weekday.

FIG. 7 is a diagram illustrating an example of the time-series data combined for the weekday.

A graph 154 represents a result obtained by combining the records of the weekday in the trend-removed time-series data from which the trend 153 has been removed from the time-series data of the graph 152. A horizontal axis of the graph 154 represents the time. A vertical axis of the graph 154 represents the resource usage. For example, when the records of the weekday are combined without removing the trend 153 from the time-series data of the graph 152, a difference between the resource usages of two times of the combined portions becomes relatively large, and thus, the resource usages are likely to be discontinuous.

Thus, the time-series data editing unit 134 combines the records of the weekday after the trend 153 is removed. The difference between the resource usages of the combined portions may be relatively small. Thus, the time-series data combined for the weekday may be handled as time-series data continuous for the two times of the combined portions.

Although not illustrated, the time-series data editing unit 134 generates the time-series data combined for the holiday by combining the records of the holiday in the trend-removed time-series data for the attribute "holiday" likewise.

Next, an example of the predicted value calculation model created by the model creation unit 135 will be described. In the following description, a simple model in which the resource usage repeatedly varies in the same pattern every day is illustrated as an example of the predicted value calculation model. The predicted value calculation model is represented by a mathematical expression, for example, information on the predicted value calculation expression.

Figure 8:
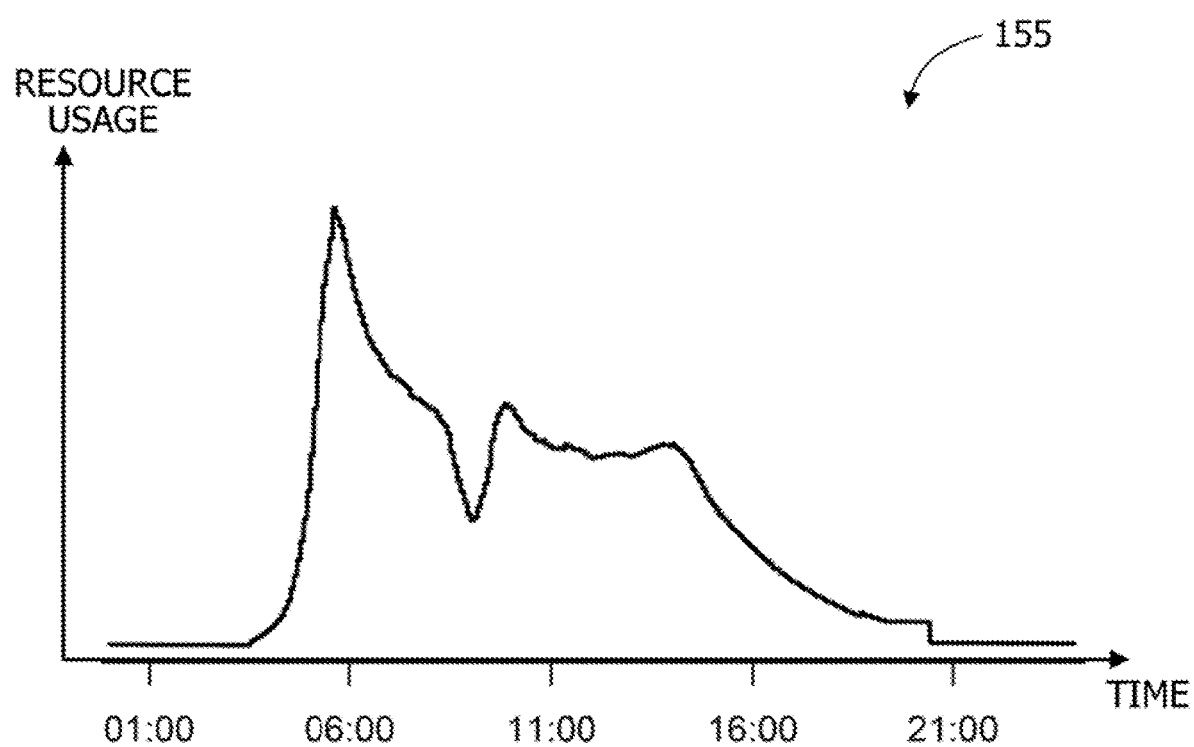
FIG. 8 is a diagram illustrating an example of a predicted value calculation model for the weekday.

FIG. 8 is a diagram illustrating an example of the predicted value calculation model for the weekday.

A graph 155 illustrates the predicted value calculation model for 0:00 to 23:59 on the weekday. A horizontal axis of the graph 155 represents the time. A vertical axis of the graph 155 represent the resource usage. The predicted value calculation model is represented by, for example, the predicted value calculation expression that is a function representing the resource usage for the time t. The time t in the predicted value calculation expression may be, for example, an absolute time or a relative time relative to a reference time. For example, the time t may be represented as a time elapsed from the reference time with 0:00 on the day as the reference time. As illustrated in the graph 155, the predicted value calculation expression is represented by a high-degree expression related to the time t.

It is conceivable that attributes obtained by categorizing "weekday" into a plurality of time zones such as "weekday daytime" and "weekday nighttime" are be used as another example of the attribute. In this case, the predicted value calculation model for the attribute "weekday daytime" is used for the time belonging to "weekday daytime", and the predicted value calculation model corresponding to the attribute "weekday nighttime" is used for the time belonging to "weekday nighttime".

Figure 9:
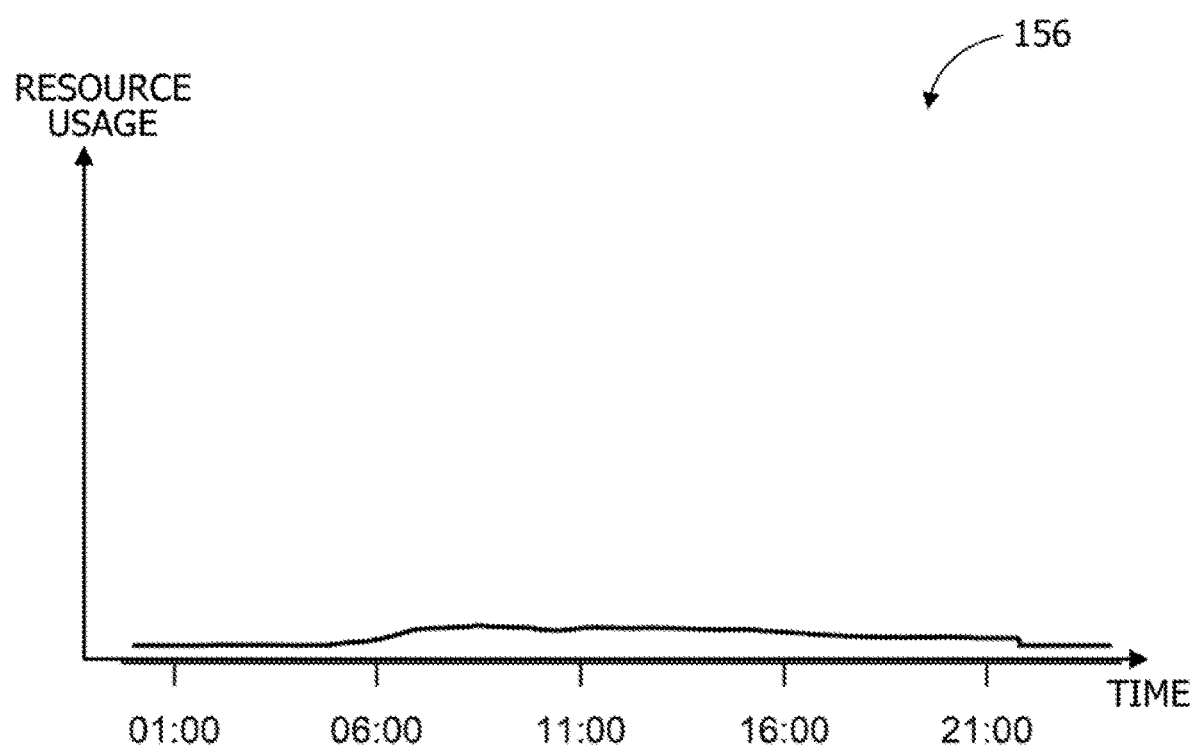
FIG. 9 is a diagram illustrating an example of a predicted value calculation model for a holiday.

FIG. 9 is a diagram illustrating an example of the predicted value calculation model for the holiday.

A graph 156 illustrates the predicted value calculation model for 0:00 to 23:59 on the holiday. A horizontal axis of the graph 156 represents the time. A vertical axis of the graph 156 represents the resource usage. The predicted value calculation model is represented by, for example, the predicted value calculation expression that is a function representing the resource usage for the time t as in the case of the weekday.

Similarly to FIG. 8, it is conceivable that attributes obtained by categorizing "holiday" into a plurality of time zones such as "holiday daytime" and "holiday nighttime" are also used as another example of the attribute. In this case, the predicted value calculation model for the attribute "holiday daytime" is used for the time belonging to "holiday daytime", and the predicted value calculation model corresponding to the attribute "holiday nighttime" is used for the time belonging to "holiday nighttime".

Although the predicted value calculation model for the resource usage in one day is illustrated in the examples of FIGS. 8 and 9, the prediction apparatus 100 may obtain the predicted value calculation model of the resource usage in another period such as one week or one month for each attribute such as the weekday or the holiday.

Figure 10:
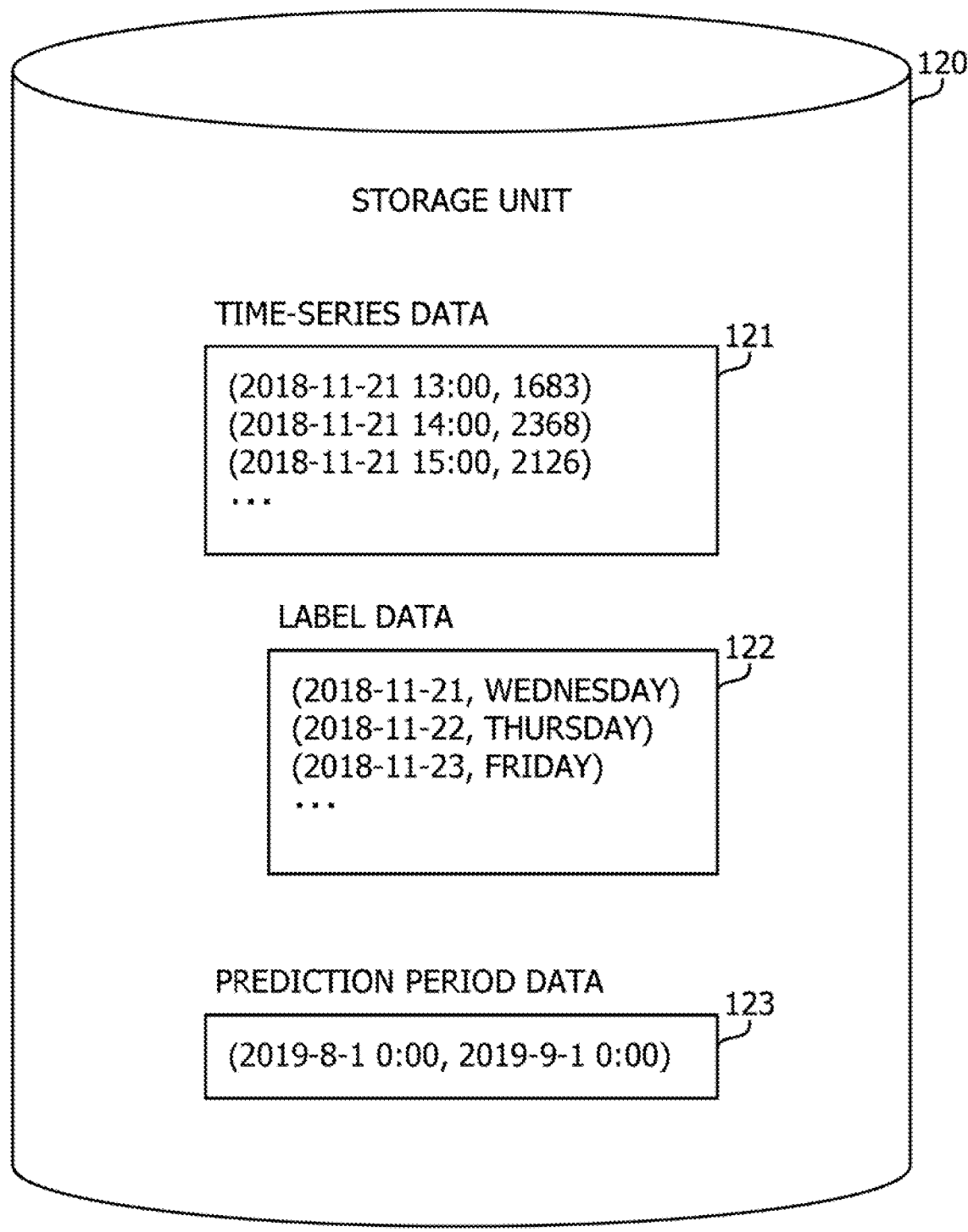
FIG. 10 is a diagram illustrating a data structure example.

FIG. 10 is a diagram illustrating a data structure example.

The storage unit 120 stores time-series data 121, label data 122, and prediction period data 123.

The time-series data 121 includes a plurality of records each having a time and a resource usage. For example, the time-series data 121 includes a record "(2018-11-21 13:00, 1683)". This record indicates that the resource usage at 13:00 on Nov. 21, 2018 is "1683". In the time-series data 121, an example in which a statistical value of the resource usage for one hour is recorded as a record of every hour at 00 minutes is represented. As the statistical value, for example, an average value, a median value, or the like for one hour of the resource usage measured every minute or every second is conceivable. As in the example of the time-series data 121, a unit of the "time" may be one hour, one minute, one second, or the like. Alternatively, the unit of "time" may be a unit longer than the illustrated unit. For example, when the prediction is performed for a relatively long period, the unit of "time" is conceivable as "day" or the like.

The label data 122 includes a plurality of records each having a date and a day of the week. For example, the label data 122 includes a record "(2018-11-21, Wednesday)". This record indicates that Nov. 21, 2018 is Wednesday. For example, it is said that the attributes of Nov. 21, 2018 and the times belonging to Nov. 21, 2018 are the weekday.

The prediction period data 123 includes a record having a start time of the prediction period and an end time of the prediction period. For example, the prediction period data 123 includes a record "(2019-8-1 0:00, 2019-9-1 0:00)". This record indicates that the start time of the prediction period is 0:00 on Aug. 1, 2019 and the end time of the prediction period is 0:00 on Sep. 1, 2019.

The storage unit 120 stores information on the trend calculation expression illustrated in FIG. 6. The trend calculation expression is represented by an expression for the time t, such as "$-1.711 \times 10^6 + 1.109 \times 10^{-3} \times t$". The time t in the trend calculation expression indicates, for example, the absolute time.

The storage unit 120 stores the pieces of information on the predicted value calculation expressions corresponding to the predicted value calculation models illustrated in FIGS. 8 and 9.

Figure 11:
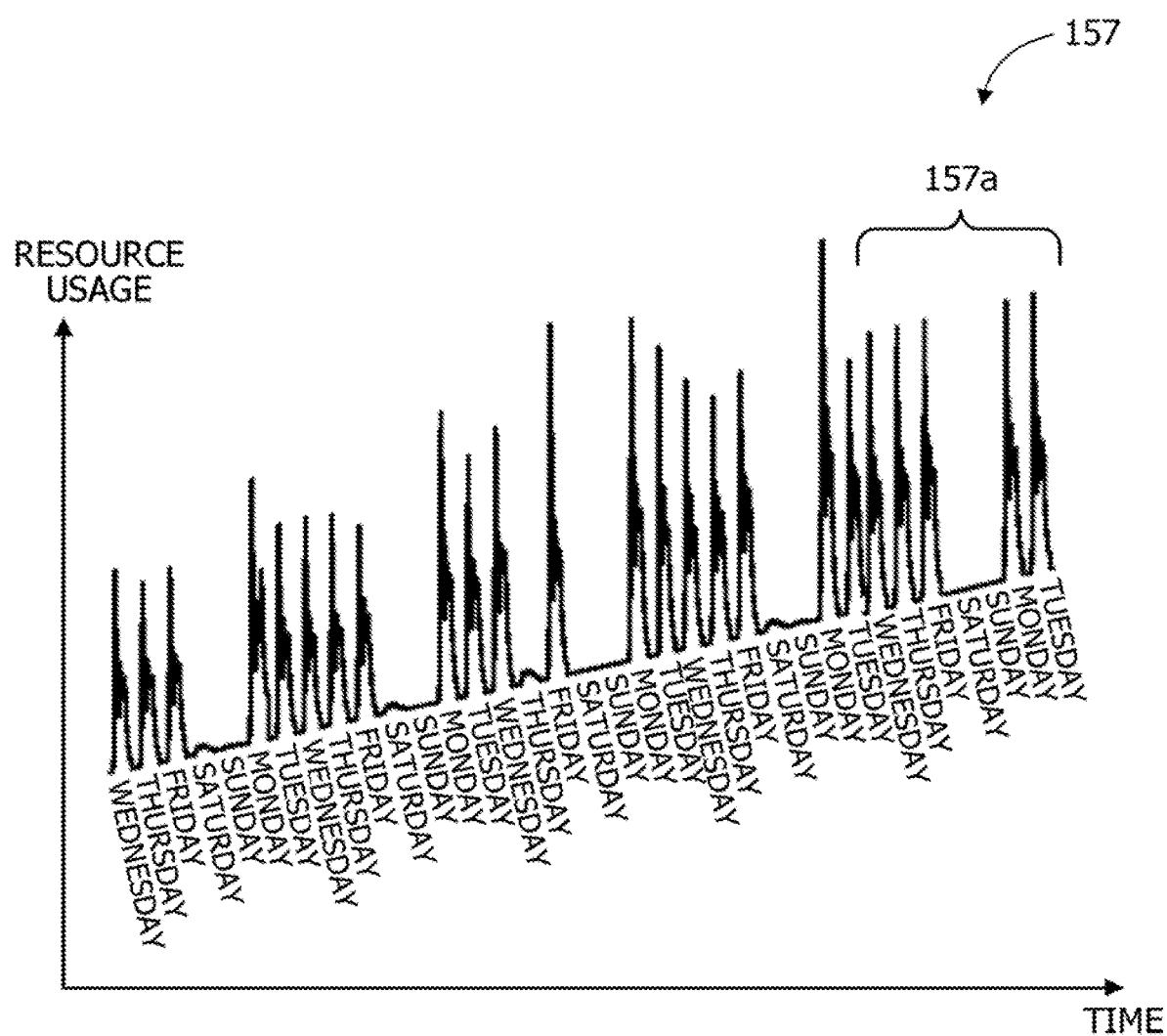
FIG. 11 is a diagram illustrating an example of a prediction result of a resource usage.

FIG. 11 is a diagram illustrating an example of the prediction result of the resource usage.

A graph 157 indicates data obtained by combining the records of the predicted values in which the trend has been restored in a prediction period 157a with the time-series data indicating the history of the resource usages of the server apparatus 200. For example, when the attributes of the weekday and the holiday are respectively assigned to the times, the prediction unit 138 calculates the predicted value of the weekday in the prediction period 157a based on the predicted value calculation expression of the weekday. The trend restoration unit 140 obtains the predicted value in which the tend has been restored by adding the trend value based on the trend calculation expression to the predicted value on the weekday. The prediction unit 138 calculates the predicted value of the holiday in the prediction period 157a based on the predicted value calculation expression of the holiday. The trend restoration unit 140 obtains the predicted value in which the trend has been restored by adding the trend value based on the trend calculation expression to the predicted value of the holiday.

As stated above, first the prediction apparatus 100 obtains the trend calculation expression indicating the trend of the change in the resource usage for the plurality of times from the input time-series data. The prediction apparatus 100 excludes the influence of the trend calculation expression for the time from the value of the record of each time in the time-series data, and then classifies the respective records of the time-series data for each attribute. The prediction apparatus 100 corrects the predicted value of the time to be predicted which is calculated by the predicted value calculation expression for each attribute based on the value of the trend calculation expression for the time to be predicted. The trend indicates a trend that does not depend on the attribute of the time. Thus, the influence of the trend is removed from the time-series data before the predicted value calculation expression for each attribute is created, and thus, an appropriate predicted value calculation expression may be created. Accordingly, the accuracy of the prediction using the predicted value calculation expression may be improved.

Next, a processing procedure performed by the prediction apparatus 100 will be described. First, as a pre-stage of the prediction, a procedure of creation processing of the predicted value calculation model will be described.

Figure 12:
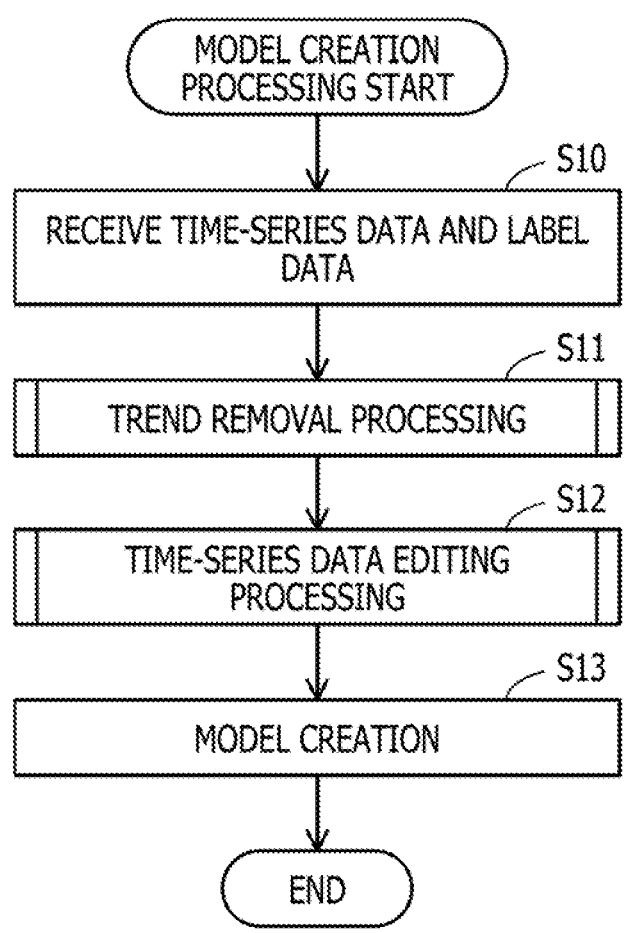
FIG. 12 is a flowchart illustrating an example of model creation processing.

FIG. 12 is a flowchart illustrating an example of the model creation processing.

(S10) The time-series data input unit 131 receives the time-series data 121, and stores the time-series data in the storage unit 120. The label input unit 133 receives the label data 122, and stores the label data in the storage unit 120.

(S11) The trend removal unit 132 acquires the time-series data 121 from the time-series data input unit 131, and generates the trend-removed time-series data by performing trend removal processing on the time-series data 121. Details of the trend removal processing will be described later.

(S12) The time-series data editing unit 134 generates the time-series data for each attribute by performing time-series data editing processing on the trend-removed time-series data. Details of the time-series data editing processing will be described later.

(S13) The model creation unit 135 creates the predicted value calculation expression for each attribute based on the time-series data for each attribute. The existing method of the time-series analysis, the machine learning, or the like may be used for creating the predicted value calculation expression. The model creation unit 135 stores the predicted value calculation expression for each attribute in the storage unit 120 in association with the information on the attribute. The model creation processing is ended.

Figure 13:
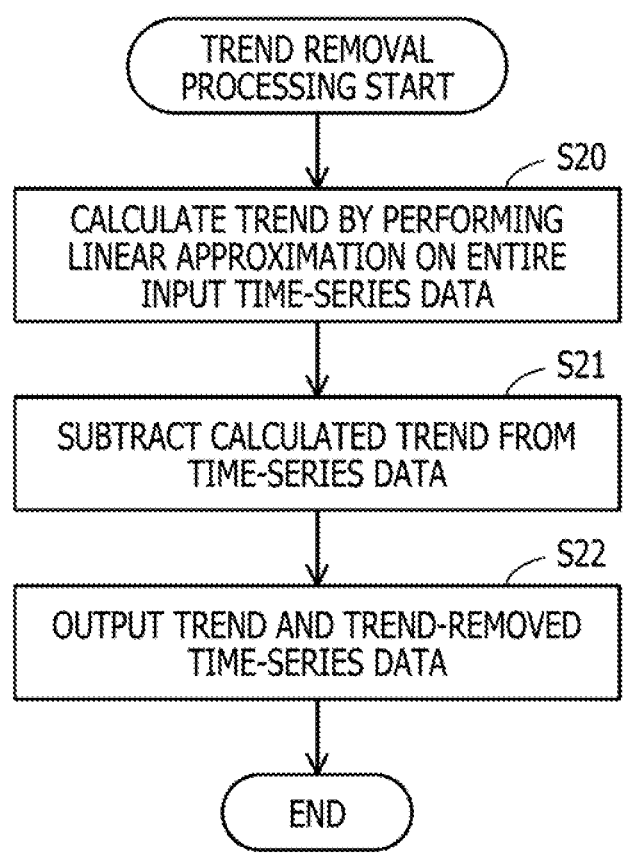
FIG. 13 is a flowchart illustrating an example of trend removal processing.

FIG. 13 is a flowchart illustrating an example of the trend removal processing.

The trend removal processing corresponds to step S11.

(S20) The trend removal unit 132 calculates the trend calculation expression by performing the linear approximation on the entire time-series data input from the time-series data input unit 131.

(S21) The trend removal unit 132 subtracts the calculated trend from the time-series data. For example, the trend removal unit 132 generates the trend-removed time-series data by subtracting the trend value of the time from the value corresponding to each time of the time-series data.

(S22) The trend removal unit 132 outputs the trend calculation expression and the trend-removed time-series data. For example, the trend removal unit 132 stores the trend calculation expression and the trend-removed time-series data in the storage unit 120. The trend removal processing is ended.

Figure 14:
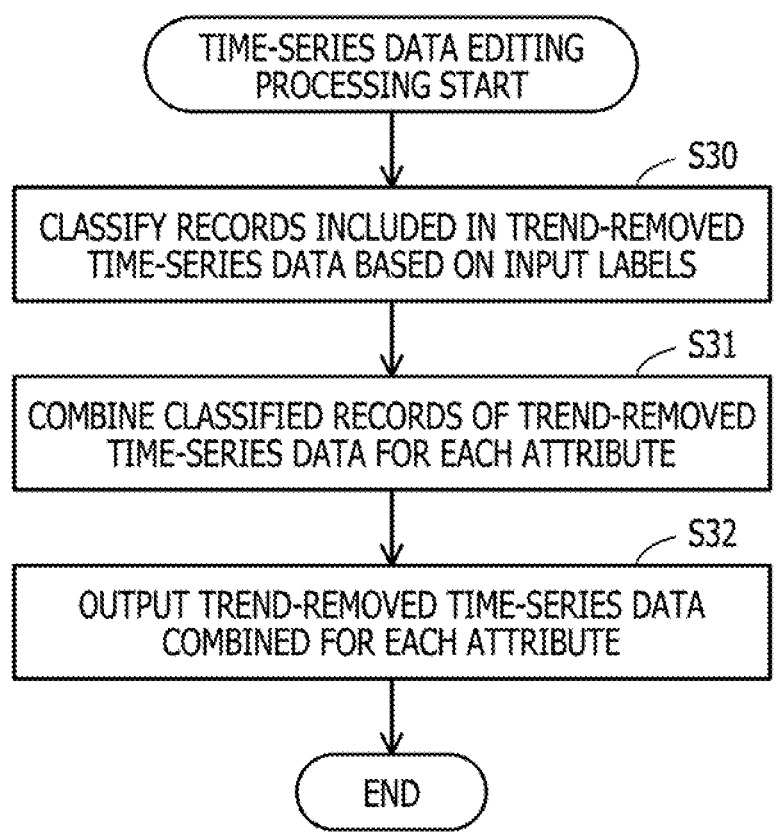
FIG. 14 is a flowchart illustrating an example of time-series data editing processing.

FIG. 14 is a flowchart illustrating an example of the time-series data editing processing.

The time-series data editing processing corresponds to step S12.

(S30) The time-series data editing unit 134 classifies the records included in the trend-removed time-series data based on the input labels. For example, the time-series data editing unit 134 determines the attribute of each time included in the trend-removed time-series data based on the label data. The time-series data editing unit 134 classifies the respective records included in the trend-removed time-series data into the group for each attribute of the time.

(S31) The time-series data editing unit 134 combines the classified records of the trend-removed time-series data for each attribute. For example, the time-series data editing unit 134 generates the time-series data for each attribute by combining the records belonging to each group in chronological order.

(S32) The time-series data editing unit 134 outputs the trend-removed time-series data combined for each attribute. For example, the time-series data editing unit 134 stores the time-series data for each attribute in the storage unit 120. The trend removal processing is ended.

Next, an example in which the times included in the time-series data are respectively classified and edited according to the attributes "weekday" and "holiday" will be described.

Figure 15:
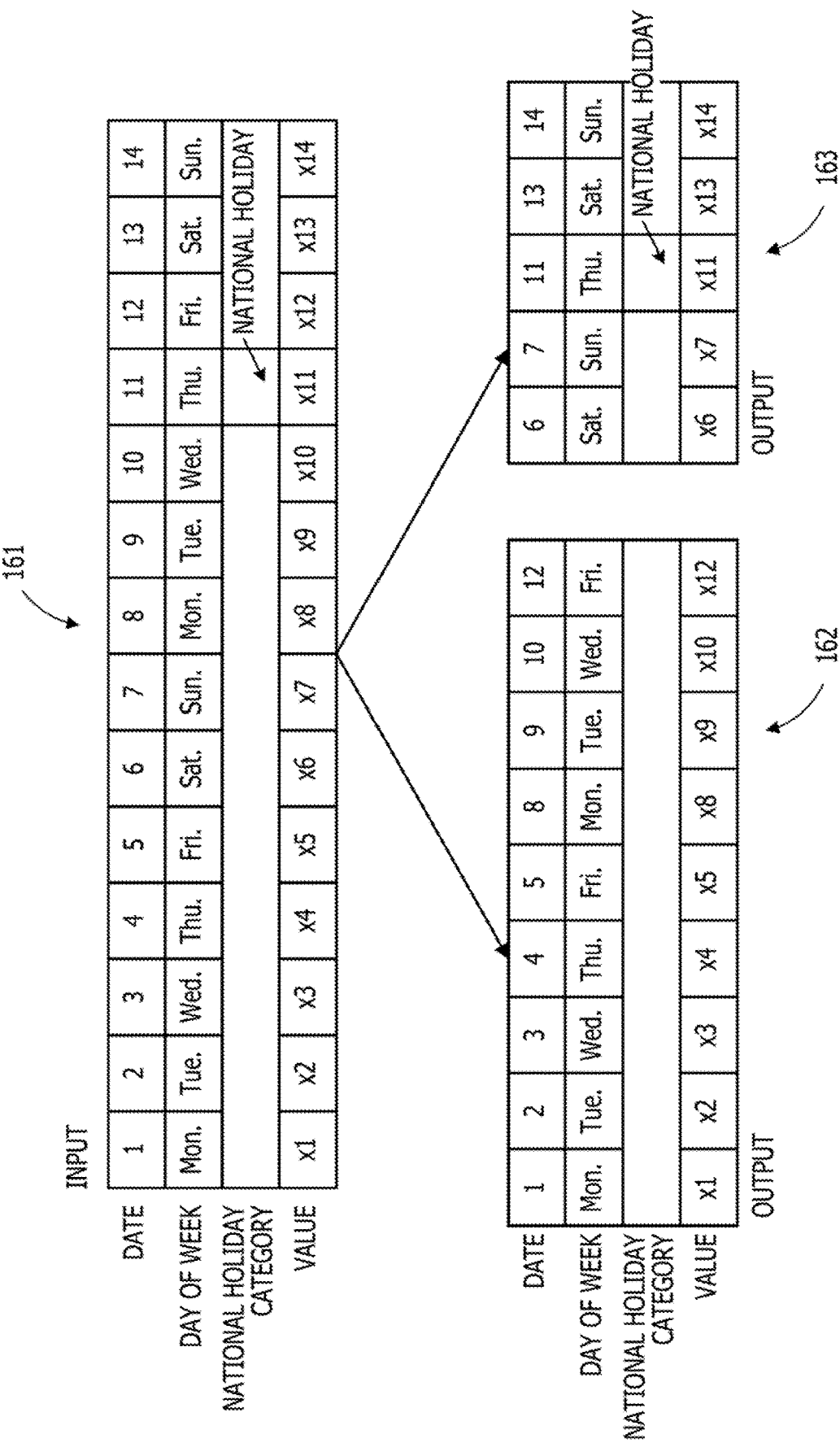
FIG. 15 is a diagram illustrating an example of editing of the time-series data.

FIG. 15 is a diagram illustrating an example of the editing of the time-series data.

Time-series data 161 is the trend-removed time-series data. The time-series data 161 is time-series data before being edited by the time-series data editing unit 134. The time-series data 161 includes items of a date, a day of the week, a national holiday category, and a value. The day of the week and the national holiday category for each date are specified by the labels included in the label data. The day of the week indicates the day of the week of the date. The national holiday category indicates whether or not the date is the national holiday.

The time-series data 161 includes a plurality of records corresponding to dates "1" to "14". The records include values of the resource usages "x1" to "x14" for the dates "1" to "14", respectively.

In FIG. 15, only one value is illustrated for one date in order to simplify the illustration, but the time-series data 161 has a value of a resource usage for each of a plurality of times belonging to each date. The same applies to pieces of time-series data 162 and 163 to be described later.

The days of the week are Monday, Tuesday, Wednesday, . . . in the order of the dates "1", "2", "3", . . . . The date "11" is Thursday and the national holiday. In the time-series data 161, Monday to Friday other than the date "11" are not the national holiday. When the date is the national holiday, information indicating that the date is the national holiday is set in the national holiday category. In FIG. 15, the information indicating that the date is the national holiday may be described as "national holiday". When the date is not the national holiday, the national holiday category is not set. In FIG. 15, "no setting" may be indicated by a blank.

In this case, the attributes of the dates "1" to "5", "8" to "10", and "12" which are Monday to Friday other than the date "11" are "weekday". The attributes of the dates "6", "7", "11", "13", and, "14" which are Saturday, Sunday, and the national holiday is "holiday". Accordingly, the attributes of the times respectively belonging to the dates "1" to "5", "8" to "10", and "12" are "weekday". The attributes of the times respectively belonging to the dates "6", "7", "11", "13", and "14" are "holiday".

The time-series data editing unit 134 classifies the respective records of the time-series data 161 into the group for each attribute. The time-series data editing unit 134 generates the time-series data 162 corresponding to the attribute "weekday" and the time-series data 163 corresponding to the attribute "holiday" by combining the plurality of records for each group in chronological order. The time-series data 162 includes the records of the dates "1" to "5", "8" to "10", and "12". The time-series data 163 includes the records of the dates "6", "7", "11", "13", and "14". The pieces of time-series data 162 and 163 may or may not include a day of the week and a national holiday category.

Next, a procedure of predicting the resource usage based on the created predicted value calculation model will be described.

Figure 16:
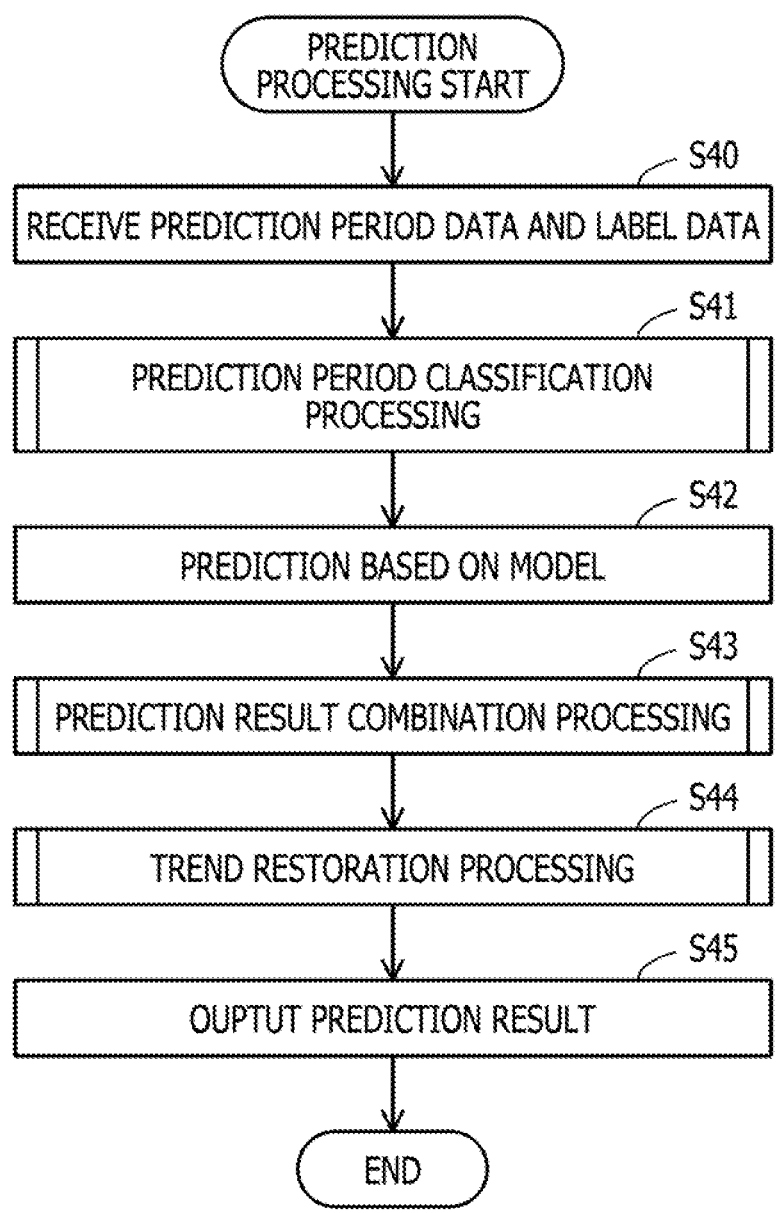
FIG. 16 is a flowchart illustrating an example of prediction processing.

FIG. 16 is a flowchart illustrating an example of prediction processing.

(S40) The prediction period input unit 136 receives the prediction period data, and stores the prediction period data in the storage unit 120. The label input unit 133 receives the label data, and stores the label data in the storage unit 120.

(S41) The prediction period classification unit 137 executes prediction period classification processing on the prediction period data. Details of the prediction period classification processing will be described later.

(S42) The prediction unit 138 calculates the predicted value of the resource usage for the prediction period based on the predicted value calculation model for each attribute. The prediction unit 138 selects the predicted value calculation expression to be used for calculating the predicted value of each time depending on the attribute of each time included in the prediction period. For example, when the attribute of the time to be predicted is "weekday", the prediction unit 138 calculates the predicted value by using the predicted value calculation expression corresponding to the attribute "weekday". When the attribute of the time to be predicted is "holiday", the prediction unit 138 calculates the predicted value by using the predicted value calculation expression corresponding to the attribute "holiday".

(S43) The prediction result combination unit 139 executes prediction result combination processing of combining the prediction results for each attribute. Details of the prediction result combination processing will be described later.

(S44) The trend restoration unit 140 executes trend restoration processing of restoring the trend for the prediction result combined by the prediction result combination unit 139. The details of the trend restoration processing will be described later.

(S45) The prediction data output unit 141 outputs the prediction data of which the trend is restored by the trend restoration unit 140. The prediction data output unit 141 stores the prediction data in the storage unit 120. The prediction data output unit 141 may transmit the prediction data to the client apparatus 300. The prediction data output unit 141 may display the content of the prediction data on the display 111. The prediction processing is ended.

Figure 17:
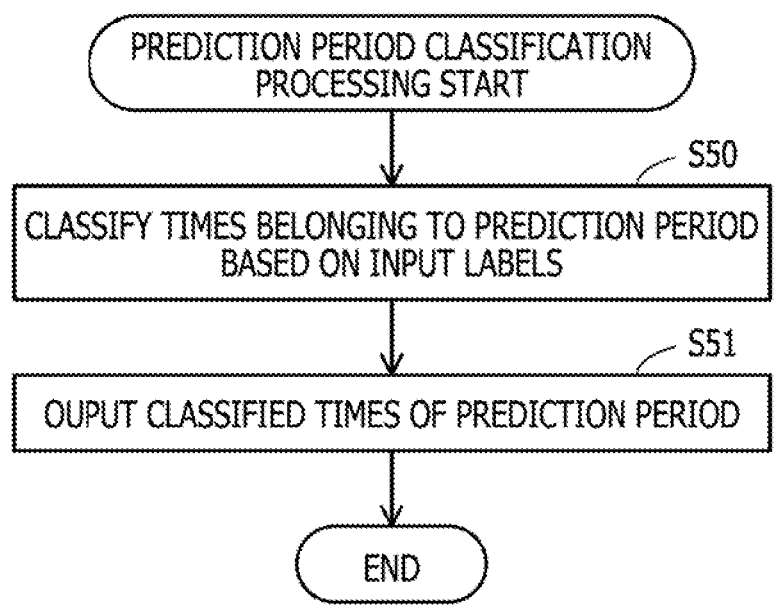
FIG. 17 is a flowchart illustrating an example of prediction period classification processing.

FIG. 17 is a flowchart illustrating an example of the prediction period classification processing.

The prediction period classification processing corresponds to step S41.

(S50) The prediction period classification unit 137 classifies the times belonging to the prediction period based on the input labels. For example, the prediction period classification unit 137 determines the attribute of each time belonging to the prediction period based on the label data, and classifies the respective times belonging to the prediction period for each attribute. For example, the prediction period classification unit 137 classifies the times belonging to the prediction period into a time group having the attribute "weekday" and a time group having the attribute "holiday".

(S51) The prediction period classification unit 137 outputs the classified times of the prediction period. The prediction period classification processing is ended.

Figure 18:
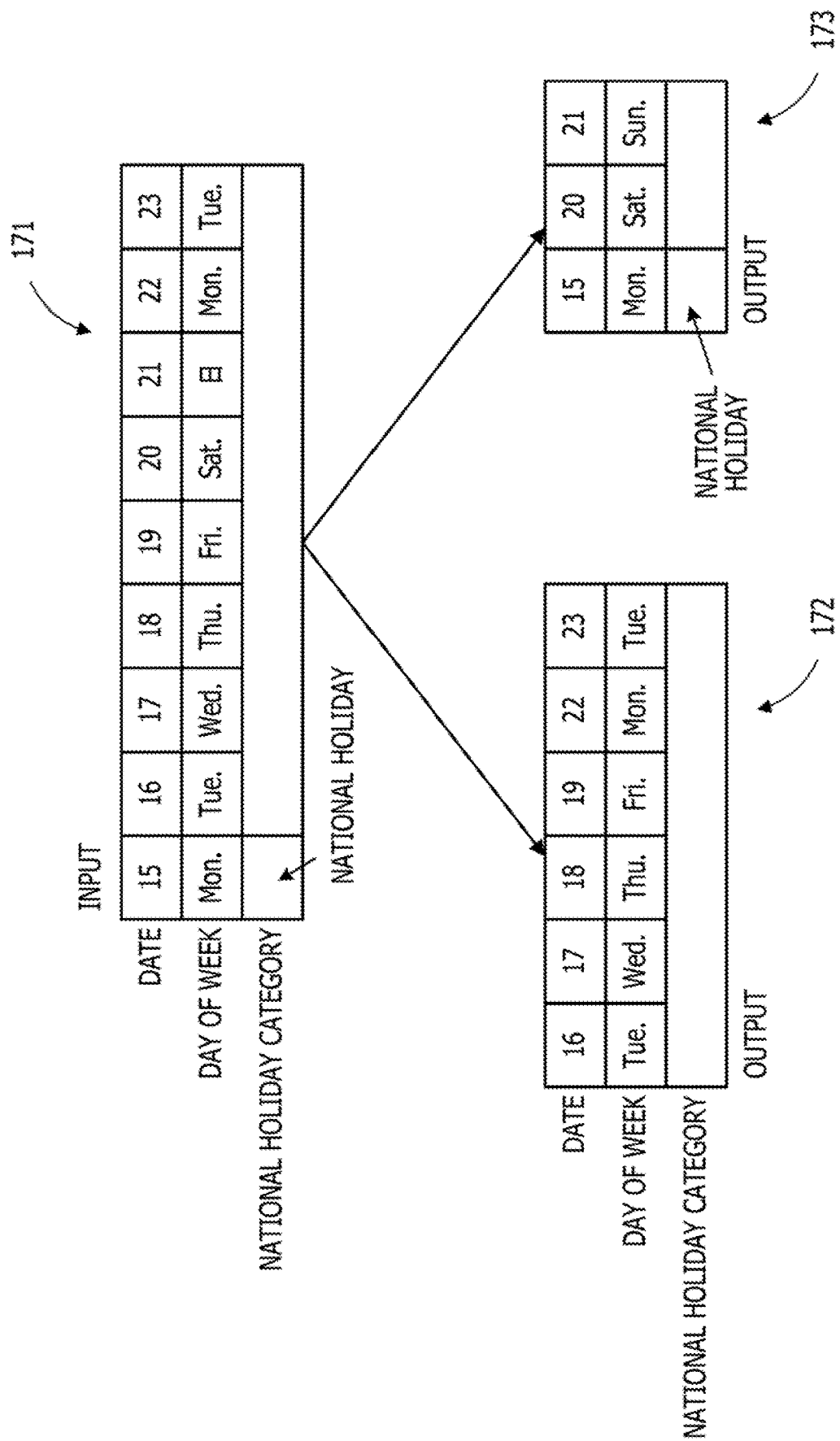
FIG. 18 is a diagram illustrating an example of classification of a prediction period.

FIG. 18 is a diagram illustrating an example of the classification of the prediction period.

Prediction period data 171 is unclassified prediction period data. The prediction period data 171 includes items of a date, a day of the week, and a national holiday category. The day of the week and the national holiday category for each date are specified by the labels included in the label data.

The prediction period data 171 includes a plurality of records corresponding to dates "15" to "23". The days of the week are Monday, Tuesday, Wednesday, . . . in the order of the dates "15", "16", "17", . . . . The date "15" is the national holiday. In the prediction period data 171, Monday to Friday other than the date "15" are not the national holiday.

In this case, the attributes of the dates "16" to "19", "22", and "23" which are Monday to Friday other than the date "15" are "weekday". The attributes of the dates "15", "20", and "21" which are Saturday, Sunday, and the national holiday are "holiday". Accordingly, the attributes of the times respectively belonging to the dates "16" to "19", "22", and "23" are "weekday". The attributes of the times respectively belonging to the dates "15", "20", and "21" are "holiday".

The prediction period classification unit 137 generates prediction period data 172 corresponding to the attribute "weekday" and prediction period data 173 corresponding to the attribute "holiday" by classifying the respective records of the prediction period data 171 into the group for each attribute. The prediction period data 172 includes the records of the dates "16" to "19", "22", and "23". The prediction period data 173 includes the records of the dates "15", "20", and "21". The pieces of prediction period data 172 and 173 may or may not include a day of the week and a national holiday category.

Figure 19:
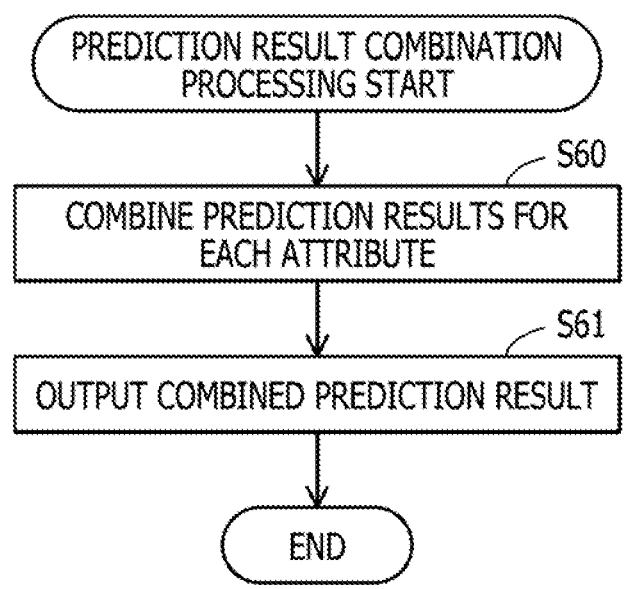
FIG. 19 is a flowchart illustrating an example of prediction result combination processing.

FIG. 19 is a flowchart illustrating an example of the prediction result combination processing.

The prediction result combination processing corresponds to step S43.

(S60) The prediction result combination unit 139 combines the prediction results for each attribute obtained by the prediction unit 138. For example, the prediction result combination unit 139 obtains one prediction result by combining the respective records of the prediction results for each attribute in the chronological order of the times.

(S61) The prediction result combination unit 139 outputs the combined prediction result. For example, the prediction result combination unit 139 stores the combined prediction result in the storage unit 120.

FIG. 20 is a diagram illustrating an example of the combination of the prediction results.

A prediction result 181 is the prediction result of the resource usage for the attribute "weekday". A prediction result 182 is the prediction result of the resource usage for the attribute "holiday". The prediction results 181 and 182 are generated by the prediction unit 138.

The predicted values of the times respectively belonging to the dates "16" to "19", "22", and "23" in the prediction result 181 are calculated by using the predicted value calculation expression corresponding to the attribute "weekday". For example, the prediction result 181 has predicted values "y1" to "y6" for the dates "16" to "19", "22", and "23".

The predicted values of the times respectively belonging to the dates "15", "20", and "21" in the prediction result 182 are calculated by using the predicted value calculation expression corresponding to the attribute "holiday". For example, the prediction result 182 has predicted values "y7" to "y9" for the dates "15", "20", and "21".

Although FIG. 20 illustrates only one predicted value for one date in order to simplify the illustration, the prediction results 181 and 182 have the predicted values of the resource usage for the plurality of times belonging to each date, respectively. The same applies to a prediction result 183 to be described later.

The prediction result combination unit 139 generates the prediction result 183 by combining the respective records included in the prediction results 181 and 182 in chronological order. The prediction result 183 includes the records having the predicted values respectively corresponding to the dates "15" to "23".

Figure 21:
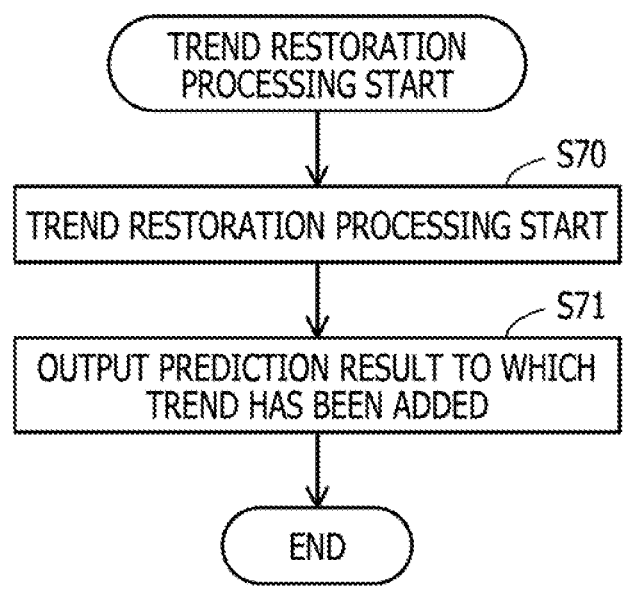
FIG. 21 is a flowchart illustrating an example of trend restoration processing.

FIG. 21 is a flowchart illustrating an example of the trend restoration processing.

The trend restoration processing corresponds to step S44.

(S70) The trend restoration unit 140 adds the trend to the prediction result combined by the prediction result combination unit 139. For example, the trend restoration unit 140 calculates the trend value at each time of the prediction result based on the trend calculation expression, and adds the trend value to the value of the time of the prediction result.

(S71) The trend restoration unit 140 outputs the prediction result to which the trend has been added. The trend restoration processing is ended. The prediction result to which the trend has been added is transmitted to the client apparatus 300 by the prediction data output unit 141 or is displayed on the display 111.

The features of the change trend of the resource usage of the server apparatus 200 may change depending on the time zone, the day of the week, or the like in which the server apparatus 200 is operated. For example, the change trend of the resource usage may vary between the weekday and the holiday. The change trend of the resource usage may vary between the time zone of the daytime and the time zone of the nighttime. When the single prediction model is created from the input time-series data by the method of the time-series analysis, the machine learning, or the like, it is difficult to reflect a change trend specific to a specific time zone, a specific day of the week, or the like on the prediction model. Thus, the accuracy of the prediction using the prediction model is reduced.

Thus, the prediction apparatus 100 obtains the predicted value calculation expression by the method of the time-series analysis, the machine learning, or the like for each attribute of the time in the time-series data indicating the history of the resource usages. For example, the predicted value calculation expression is individually generated for each attribute of the time in the time-series data. The features of the change trend corresponding to the attribute such as the time zone or the day of the week are likely to be reflected on the predicted value calculation expression. Thus, the prediction apparatus 100 may improve the prediction accuracy by performing the prediction by using the predicted value calculation expression.

The prediction apparatus 100 generates the predicted value calculation expression for each attribute after a trend indicating a rough trend such as an overall upward trend for the input time-series data is excluded from the time-series data. Accordingly, the accuracy of the predicted value calculation expression to be generated may be improved as compared to a case where the predicted value calculation expression is generated by adding the trend. In the case of the prediction, the prediction apparatus 100 obtains the predicted value by correcting the calculation value calculated by the predicted value calculation expression with the value depending on the trend. Accordingly, the accuracy of the prediction may be improved as compared to a case where the prediction is performed by using the predicted value calculation expression generated by adding the trend.

When a future value is predicted by modeling the time-series data having the trend, a model for calculating the predicted value may be expressed by a simple model having relatively few parameters. Thus, the modeling may be performed with a relatively small amount of data, and accurate prediction may be performed with a small amount of data.

Although it has been described in the second embodiment that "weekday" and "holiday" are mainly used as the attributes for classifying the plurality of records included in the time-series data into the groups, it is conceivable that the records are grouped with other attributes.

For example, the attributes may be "daytime" and "nighttime". When "daytime" and "nighttime" are used as the attributes, the time-series data and information indicating which of the attributes "daytime" and "nighttime" each time of the prediction period corresponds to are input to the prediction apparatus 100 as the label data.

The attributes may be "weekday daytime", "weekday nighttime", "holiday daytime", and "holiday nighttime". In this case, the time-series data and information indicating which of the attributes of "weekday daytime", "weekday nighttime", "holiday daytime", and "holiday nighttime" each time of the prediction period corresponds to are input to the prediction apparatus 100 as the label data.

Alternatively, the attributes may be the days of the week such as "Monday", "Tuesday", . . . .

Which of the attributes is used is determined depending on a usage trend of the user of the server apparatus 200 corresponding to the day of the week, the weekday or the holiday, the time zone of the daytime or the nighttime, and the like.

The information processing according to the first embodiment may be realized by causing the processing unit 12 to execute a program. The information processing according to the second embodiment may be realized by causing the CPU 101 to execute a program. The program may be recorded in the recording medium 113 that is computer-readable.

For example, it is possible to circulate the program by distributing the recording medium 113 in which the program is recorded. The program may be stored in another computer, and the program may be distributed through a network. For example, the computer may store (install), in a storage device such as the RAM 102 or the HDD 103, the program recorded in the recording medium 113 or the program received from the other computer, and may read the program from the storage device to execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention,

What is claimed is:

1. A usage prediction method executed by a computer, the usage prediction method comprising:
classifying a plurality of records corresponding to a plurality of times included in first time-series data indicating a history of usages of a resource into a plurality of groups respectively corresponding to attributes of the plurality of times;

generating second time-series data for each attribute by combining the records belonging to the group corresponding to the same attribute for the plurality of classified groups in order of the times;

generating, for each attribute, an expression for calculating a predicted value to be used for calculating a predicted value of the usage based on the generated second time-series data; and calculating the predicted value of the usage based on the expression for calculating the predicted value for each attribute, wherein the classifying of the plurality of records includes obtaining an expression for calculating a trend indicating a trend of a change in the usage for the plurality of times from the first time-series data, and performing the classifying after an influence of the trend calculation expression for the time is removed from a value of the record of each time in the first time-series data, and the calculating of the predicted value includes correcting the predicted value of the time to be predicted calculated by the predicted value calculation expression based on a value of the expression for calculating the trend for the time to be predicted, and wherein the calculating of the predicted value includes selecting the expression for calculating the predicted value to be used for calculating the predicted value for the time to be predicted depending on the attribute of the time to be predicted, and outputting a prediction result obtained by combining the predicted values respectively calculated for a plurality of the times to be predicted in the order of the times to be predicted.

2. The usage prediction method according to claim 1, further comprising:

determining the attribute of each of the plurality of times based on a day of the week or a time zone of a day to which each of the plurality of times belongs.

3. A non-transitory computer-readable storage medium storing a program that causes a computer to execute a process, the process comprising:

classifying a plurality of records corresponding to a plurality of times included in first time-series data indicating a history of usages of a resource into a plurality of groups respectively corresponding to attributes of the plurality of times;

generating second time-series data for each attribute by combining the records belonging to the group corresponding to the same attribute for the plurality of classified groups in order of the times;

generating, for each attribute, an expression for calculating a predicted value to be used for calculating a predicted value of the usage based on the generated second time-series data; and calculating the predicted value of the usage based on the expression for calculating the predicted value for each attribute, wherein the classifying of the plurality of records includes obtaining an expression for calculating a trend indicating a trend of a change in the usage for the plurality of times from the first time-series data, and performing the classifying after an influence of the trend calculation expression for the time is removed from a value of the record of each time in the first time-series data, and the calculating of the predicted value includes correcting the predicted value of the time to be predicted calculated by the predicted value calculation expression based on a value of the expression for calculating the trend for the time to be predicted, and wherein the calculating of the predicted value includes selecting the expression for calculating the predicted value to be used for calculating the predicted value for the time to be predicted depending on the attribute of the time to be predicted, and outputting a prediction result obtained by combining the predicted values respectively calculated for a plurality of the times to be predicted in the order of the times to be predicted.

4. The non-transitory computer-readable storage medium storing a program according to claim 3, wherein the process comprising:

determining the attribute of each of the plurality of times based on a day of the week or a time zone of a day to which each of the plurality of times belongs.

* * * * *